United States Patent [19]
Nishihara et al.

[11] Patent Number: 5,790,767
[45] Date of Patent: Aug. 4, 1998

[54] INFORMATION OUTPUTTING APPARATUS

[75] Inventors: Yoshio Nishihara; Shinichiro Taniguchi; Eigo Nakagawa, all of Nakai-machi, Japan

[73] Assignee: Fuji Xerox Co., Ltd., Tokyo, Japan

[21] Appl. No.: 733,607

[22] Filed: Oct. 18, 1996

[30] Foreign Application Priority Data

Apr. 19, 1996 [JP] Japan .................................. 8-122463

[51] Int. Cl.⁶ .................................................. G06K 15/00
[52] U.S. Cl. .................................... 395/115; 395/112
[58] Field of Search ................................. 395/112, 117, 395/106, 101, 115–116; 358/468, 448, 488; 399/18, 16, 367, 368, 369, 382, 389

[56] References Cited

U.S. PATENT DOCUMENTS

| 5,051,779 | 9/1991 | Hikawa | 399/367 |
| 5,161,037 | 11/1992 | Saito | 358/468 |
| 5,563,986 | 10/1996 | Suzuki | 395/112 |

FOREIGN PATENT DOCUMENTS

| 1-106571 | 4/1989 | Japan . |
| 1-198865 | 8/1989 | Japan . |
| 2-96466 | 4/1990 | Japan . |

*Primary Examiner*—Arthur G. Evans
*Attorney, Agent, or Firm*—Oliff & Berridge, PLC

[57] ABSTRACT

The present invention provides an information outputting apparatus which stores data in an information storage medium and forms an image based on the data on a recording sheet, and the information outputting apparatus comprises inputting means for inputting the data, image forming means for forming an image of at least a part of the data inputted by the inputting means on the recording sheet, storing means for storing the data inputted by the inputting means in the information storage medium, recording sheet ejecting means for ejecting the recording sheet on which the image is formed by the image forming means to the outside of the apparatus, and information storage medium ejecting means for ejecting the information storage medium in which the data is stored by the storing means to the outside of the apparatus in synchronization with the ejecting of the recording sheet by the recording sheet ejecting means.

32 Claims, 27 Drawing Sheets

INFORMATION OUTPUTTING APPARATUS

BACKGROUND OF THE INVENTION

1. Field of the Invention

The present invention relates to an information outputting apparatus storing data in an information storage medium and forming an image according to the data on a recording sheet, and in particular relates to an information outputting apparatus which enables easy management of the information storage medium storing the data and the recording sheet on which the image is formed.

2. Discussion of the Related Art

Based on the recent advancement of the electronic technology, various information appliances have been developed, and in cooperation with the development of the electronic information network, it has been possible for an individual person to deal with electronic information easily. Moreover, by constructing a database of the electronic information, required information can be obtained quickly. As for non-electronic, paper-printed information, the contents of the information are inputted by a keyboard based on understanding of the user, or read by an image scanner to convert the non-electronic information into electronic information and construct a database thereof.

However, it takes a long time and requires much labor to input the information by the keyboard based on the understanding of the user, and besides, attention should be paid to inputting mistakes. In the case of reading the information by the image scanner and automatically recognizing the read data by recognition techniques, an enormous amount of post-processing such as feature extraction or character recognition is required, and there is also a problem that the processing accuracy in the current status itself is not considerably high.

As the techniques to overcome the problem which lies between two kinds of information, namely, electronic information and nonelectronic information, inventions disclosed by Japanese Patent Applications Laid-Open Nos. Hei. 1-198865 (1989), Hei. 1-106571 (1989) and Hei. 2-96466 (1990) are known.

The invention disclosed by the Japanese Patent Application No. Hei. 1-198865 (1989) is a copying machine which forms an image on a recording sheet in accordance with image data read from the original document, and stores the image data in an information storage medium such as a floppy disk. The image data can be printed, and in addition, the information in the original document can be written electronically in the information storage medium, and moreover, the image stored in the information storage medium can also be printed and outputted to the outside.

The invention disclosed by the Japanese Patent Application No. Hei. 1-106571 (1989) relates to a multimedia copying machine having a function of copying data from a floppy disk to a recording sheet. According to the invention, the data stored in the floppy disk can be directly copied to the recording sheet regardless of the type of data format stored in the floppy disk since the text code stored in the floppy disk is converted into image data.

The invention disclosed by the Japanese Patent Application No. Hei. 2-96466 (1990) is proposed on the premise of the invention disclosed by the Japanese Patent Application No. Hei. 1-198865 (1989), which stores the retrieving information as well as the image data in the floppy disk, and the retrieving information is read and displayed as the data is read from the floppy disk, whereby required data is retrieved quickly in accordance with the displayed retrieving information while secrecy is maintained.

In the above-described inventions conventionally proposed, the data to be printed on the recording sheet can be stored in the external information storage medium, or the data can be read from the information storage medium and printed on the recording sheet. However, the user has to remember relations between various data stored in the information storage medium and recording sheets on which the data are printed, and besides, it is impossible to understand contents of the data stored in the information storage medium at a glance, and therefore the management of the information is rather complex and requires much labor.

Furthermore, the image data is generally a fairly large amount of data, whereas the information storage medium such as a floppy disk has small storage capacity. Therefore, in the conventional inventions such as described above, the user has to frequently supply new information storage media for completing the storing process when the image data is stored in such information storage medium of small storage capacity, and accordingly the operation process results in a considerable labor.

In managing or using information, it is required to record additional information, for example, a person making the data and purpose of the use, later and separately in addition to the image data stored in the information storage medium in advance, but such additional recording cannot be realized in the above-described conventional inventions.

SUMMARY OF THE INVENTION

The present invention has been made in view of the above circumstances and has an object to provide an information outputting apparatus which enables a user to easily understand relations between various data recorded in the information storage media and recording sheets on which images are formed in accordance with the data, and enables easy management of the outputted information.

Another object of the present invention is to provide an information outputting apparatus which automatically supplies the information storage media if necessary.

Further object of the present invention is to provide an information outputting apparatus which is able to record additional information separately in addition to image data already recorded in an information storage medium.

Additional objects and advantages of the invention will be set forth in part in the description which follows and in part will be obvious from the description, or may be learned by practice of the invention. The objects and advantages of the invention may be realized and attained by means of the instrumentalities and combinations particularly pointed out in the appended claims. To achieve the objects and in accordance with the purpose of the invention, as embodied and broadly described herein, an information outputting apparatus of the present invention, which stores data in an information storage medium and forms an image based on the data on a recording sheet, comprises inputting means for inputting the data, image forming means for forming an image of at least a part of the data inputted by the inputting means on the recording sheet, storing means for storing the data inputted by the inputting means in the information storage medium, recording sheet ejecting means for ejecting the recording sheet on which the image is formed by the image forming means to the outside of the apparatus, and information storage medium ejecting means for ejecting the information storage medium in which the data is stored by the storing means to the outside of the apparatus in synchronization with the ejecting of the recording sheet by the recording sheet ejecting means.

BRIEF DESCRIPTION OF THE DRAWINGS

The accompanying drawings, which are incorporated in and constitute a part of this specification illustrate embodiment of the invention and, together with the description, serve to explain the objects, advantages and principles of the invention. In the drawings.

DETAILED DESCRIPTION OF THE PREFERRED EMBODIMENT

Preferred embodiment of an information outputting apparatus according to the present invention is now described in detail based on the drawings.

First Embodiment

Figure 1:
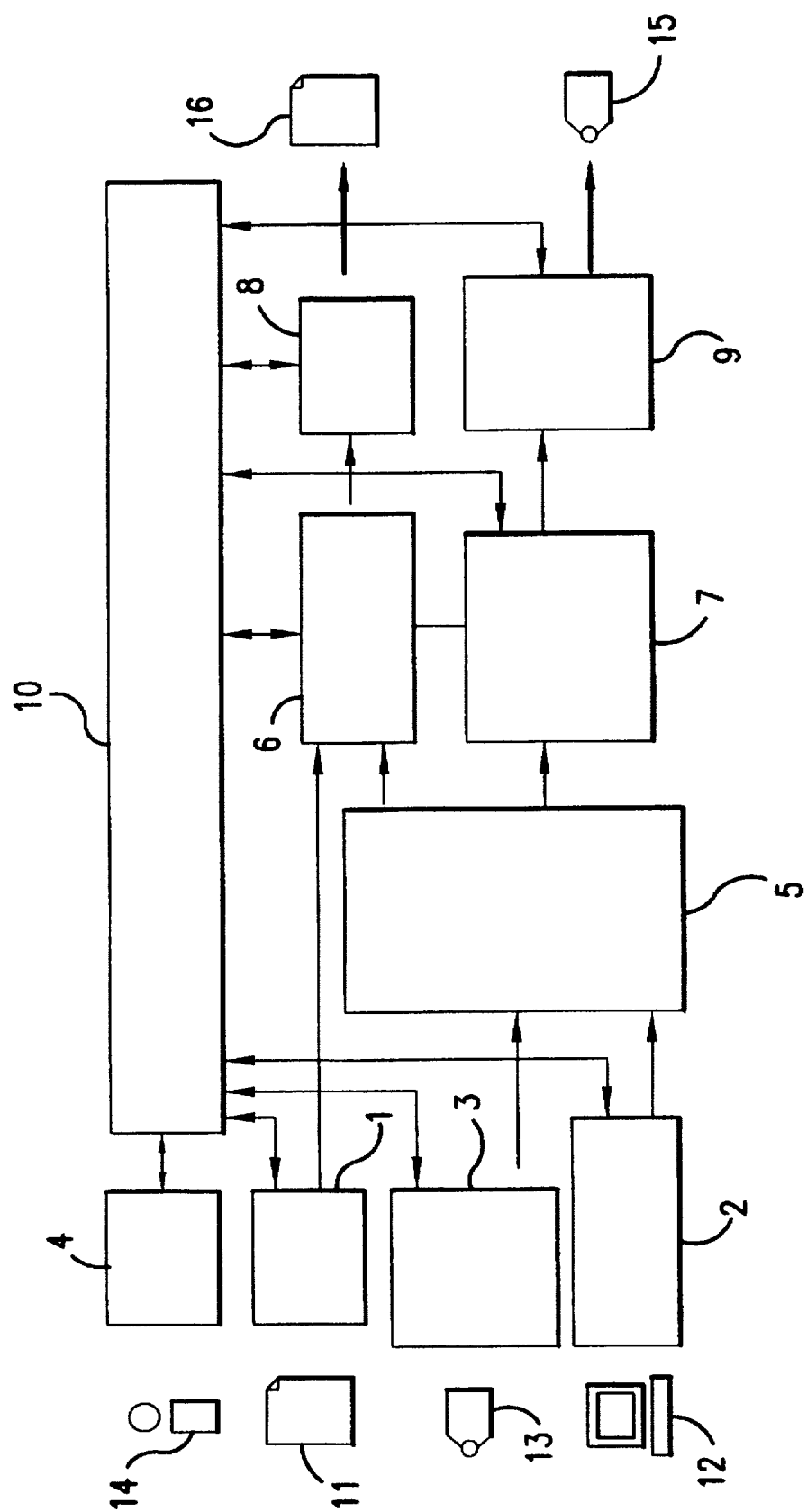
FIG. 1 shows the functional construction of an embodiment of an information outputting apparatus according to the present invention.

FIG. 1 shows the functional construction of an embodiment of an information outputting apparatus according to the present invention. The information outputting apparatus comprises a document inputting component 1 for reading a document 11, such as an image scanner, an external data inputting component 2 for receiving data from an external information appliance 12 through a network or the like, an information attachment device reading component 3 for reading data from an information attachment device (an information storage medium) 13, a direction inputting component 4 for receiving a direction from a user 14, a data separating component 5 for separating data inputted through the external data inputting component 2 or the information attachment device reading component 3 into print data (image data) for forming an image on a recording sheet and data to be written only in the information attachment device 15, a print data editing component 6 for editing the print data, an information attachment device data editing component 7 for editing data to be written in the information attachment device 15, a document outputting component 8 for forming the print data after editing as an image on a recording sheet 16 and ejecting the sheet, an information attachment device outputting component 9 for writing data after editing in the information attachment device 15 and ejecting the device, and a system controlling component 10 for generally controlling processes executed by these components 1-9.

Figure 2:
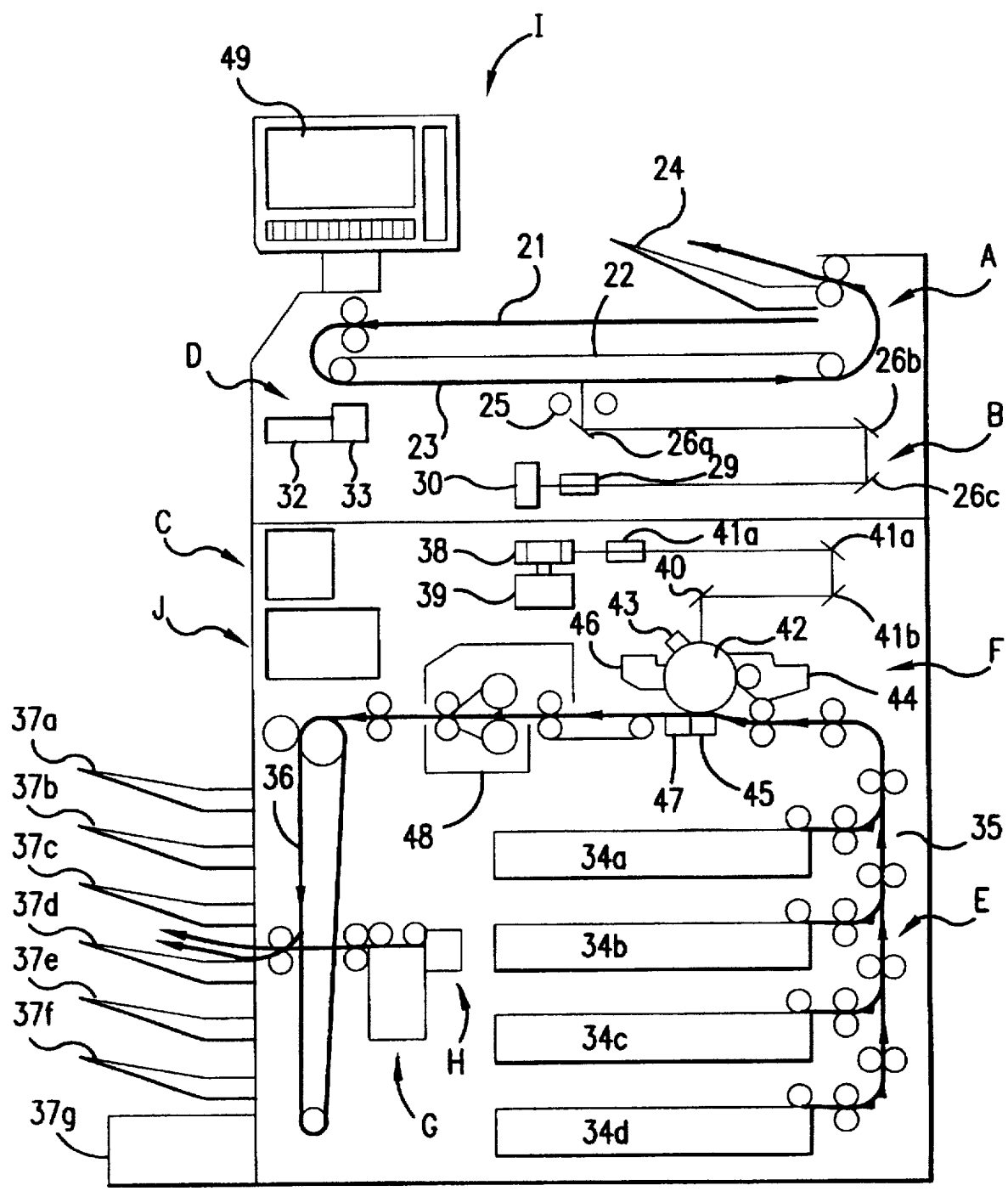
FIG. 2 shows an internal construction of the embodiment of the information outputting apparatus according to the present invention.
Figure 3:
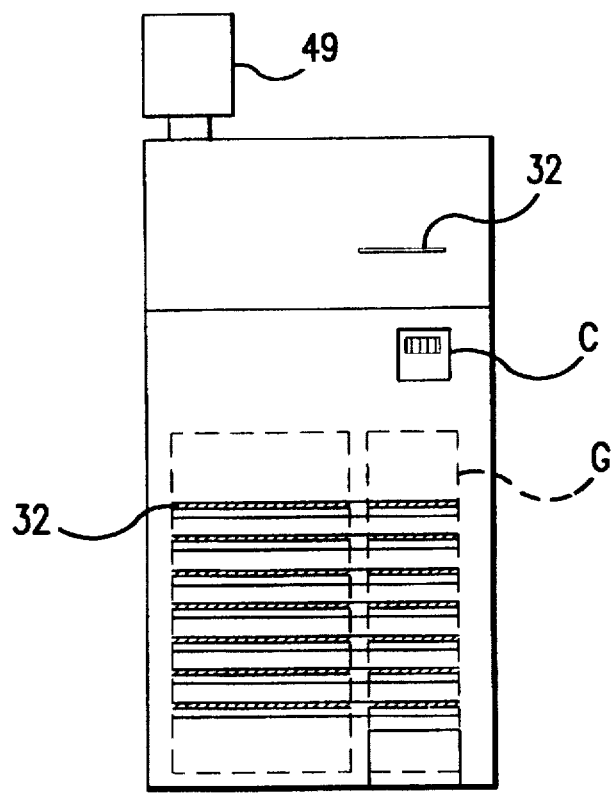
FIG. 3 shows a side external view of the embodiment of the information outputting apparatus according to the present invention.

FIGS. 2 and 3 show the internal construction and side external view of the embodiment of the information outputting apparatus, respectively. The information outputting apparatus comprises a document feeder A and a document reader B which are corresponding to the document inputting component 1 in the functional construction, an external data inputting part C corresponding to the external data inputting component 2, an information attachment device reading part D corresponding to the information attachment device reading component 3, a recording sheet feeding part E and an image writing part F corresponding to the document outputting component 8, an information attachment device feeding part G and an information attachment device writing part H corresponding to the information attachment device outputting component 9, a direction inputting part I corresponding to the direction inputting component 4 and an electronic circuit J corresponding to the data separating component 5, print data editing component 6, information attachment device data editing component 7 and the system controlling component 10.

The document feeding part A is means for carrying documents (not shown in the figure) put on a document stand 21 for reading, which forwards documents put on the document stand 21 one by one by rollers and a belt 22 and sets a document on a platen 23, and after exposing and scanning process by the document reader B, forwards the document on the platen 23 by the rollers and belt 22 to be ejected to a document ejection tray 24.

The document reading part B is means for reading image data from the document. On receiving an input starting direction signal from the system controlling component 10, the document reading part B lights an exposing lamp 25 and drives a scanner motor (not shown in the figure) to move a mirror 26a, whereby the document on the platen 23 is exposed and scanned. A reflected light beam from the document is further reflected by mirrors 26a, 26b and 26c to be incident on a CCD line sensor 30 through a converging lens 29, and is converted into an electrical signal by the CCD line sensor 30 and finally outputted to the print data editing part 6.

The external data inputting part C receives data from a local information equipment directly connected or a remote information equipment connected through the communication network, for example, ethernet by serial communication such as RS232C or parallel communication such as printer ports provided to a personal computer, and then outputs data to the data separating component 5.

Figure 4A:
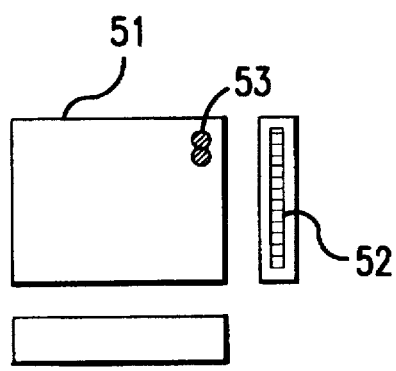
FIGS. 4(a) and 4(b) show the construction of an information attachment device in the embodiment of the information outputting apparatus according to the present invention.
Figure 4B:
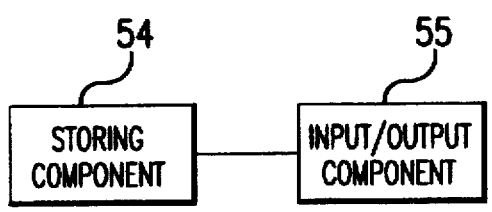

Here, the information attachment device 51 used in the embodiment (in FIG. 1, indicated by reference numerals 13 and 15) is explained with reference to FIG. 4(a) showing its external view from three sides (front, side and top) and FIG. 4(b) showing its functional construction. The information attachment device 51 is a card-type storage device and comprises an electric connector 52, an infrared ray send/receive device 53, and so forth, for communicating with other devices. The internal construction consists of a storing part 54 using an electronic storage element such as SRAM, an input/output part 55 for inputting/outputting data to/from the storing part 54 through the electric connector 52 or infrared ray send/receive device 53, and thereby the information attachment device 51 stores the data readably and writably.

The current embodiment uses the information attachment device 51 as described above as the information storage medium for the electronic data, but in the present invention, various kinds of information storage media which are known to public such as a floppy disk can be used.

A guide 32 having a guiding groove is provided to the information attachment device reading part D. The information attachment device 51 is inserted in the information attachment device reading part D along the guide 32, and a connector 33 of the information attachment device reading part D and the electric connector 52 of the information attachment device 51 is electrically connected with each other. As the starting direction signal is sent by the system controlling part 10, data in the information attachment device 51 is read through the connectors 52 and 53, and then outputted to the data separating component 5.

The sheet feeding part E supplies the sheet on which the image is to be formed and printed, and further ejects the sheet on which the image is formed to the outside of the apparatus. As the system controlling component 10 transmits starting direction signal of image writing, a sheet of paper is forwarded by the roller from a tray specified and selected by a sheet feeding tray selecting direction signal from the system controlling component 10 out of four-tier sheet feeding trays 34a, 34b, 34c and 34d, and carried to the image writing part F by a sheet carrier path 36. After the sheet on which an image is formed is forwarded from the image writing part F, it is carried through the sheet carrier path 36 moving upward and downward by a motor (not shown in the figure), and finally ejected to a tray specified by an output tray selecting direction signal from the system controlling component 10 out of six-tier output trays 37a, 37b, 37c, 37d, 37e and 37f. A tray 37g in FIG. 2 is a tray for ejecting the information attachment device on which the data cannot be written, as described later.

The image writing part F is means for forming and printing an image on the recording sheet corresponding to print data, which changes a laser beam (not shown in the figure) modulated according to the print data and outputted by a semiconductive laser (not shown in the figure) to a parallel width light beam by a cylinder lens (not shown in the figure), and irradiate it to a polygon mirror 38 rotated with a constant speed by a polygon motor 39. Then the image writing part F adjusts the reflected light beam by the fθ lens 40 so that a photoreceptor 42 is scanned with a constant speed and makes the reflected light beam further reflect on mirrors 41a, 41b, and 41c so that the photoreceptor 42 charged by a charger corotron 43 is exposed for forming an electrostatic latent image. Then the electrostatic latent image is developed to be a toner image by the toner in a developing device 44 and the toner image is transferred to the recording sheet by a transfer corotron 45. The toner particles which are not transferred and remaining on the photoreceptor 42 are removed by a cleaner 46. The recording sheet on which the toner image is transferred is detached from the photoreceptor 42 by a detach corotron 47 and forwarded to a fuser 48 where the toner image is fused on the recording sheet by heating and pressure applying process.

Figure 5:
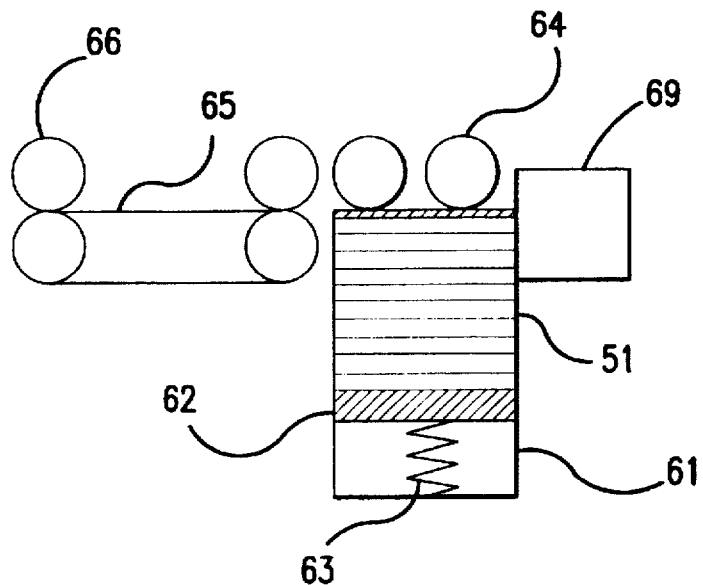
FIG. 5 shows the construction of a mechanism for supplying the information attachment device of the embodiment of the information outputting apparatus according to the present invention.

The information attachment device feeding part G and the information addition device writing part H are constructed as shown in FIG. 5. The information attachment device feeding part G supplies and ejects the information attachment device 51, and the information attachment device writing part H writes data in the information attachment device 51.

The information attachment device feeding part G holds a pile of plural information attachment devices 51 on a bottom plate 62 of a stack 61. The information attachment devices 51 are pushed up by a spring 63 and an information attachment device 51 at the top is pressed to rollers 64. When an information attachment device writing starting signal is sent from the system controlling component 10, a single information attachment device 51 at the top is forwarded by the rollers 64 while the connector 52 of the information attachment device 51 and the connector 69 of the information attachment device writing part H is electrically connected, thus the data is written in the information attachment device 51. The information attachment device 51 in which the data is written is forwarded to a conveyor belt 65 by rollers 64 and the conveyor belt 65 is driven by a motor (not shown in the figure) to forward the information attachment device 51 to a tray specified by an information attachment device output tray selecting direction signal from the system controlling component 10. The information attachment device 51 in which the data is written is ejected to the same tray to which the recording sheet on which an image is formed based on the corresponding data is ejected.

The direction inputting part I is a unit 49 consisting of a display screen for prompting the user to provide a direction or showing information and a transparent touch panel put on the surface of the display screen for receiving the direction from the user, whereby the user can input the direction while confirming the displayed information. As long as it is possible to show necessary information and obtain directions, the direction inputting part I may be some other construction utilizing a mechanical switch, for example.

Figure 6:
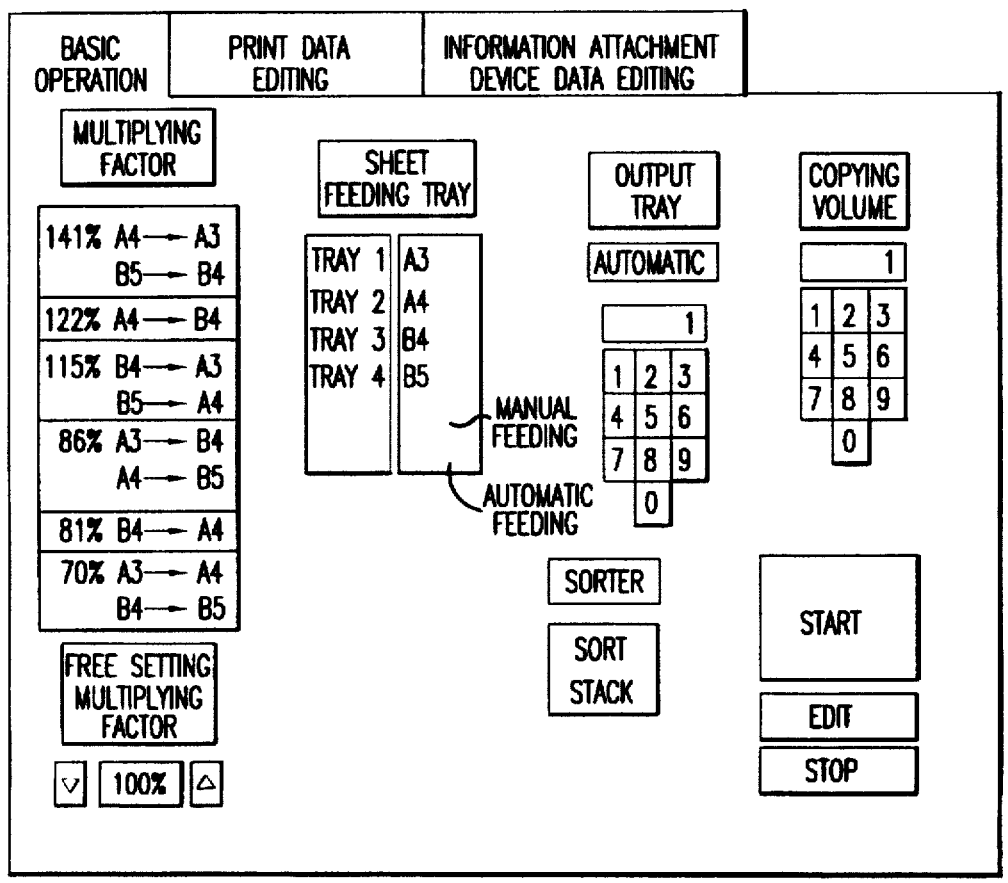
FIG. 6 shows an example of display of a screen for basic operation.

FIG. 6 shows an example of contents displayed on the display screen of the unit 49 for basic operation. In the display screen, the multiplying factor in forming an image on the recording sheet, the size of the recording sheet on which the image is formed and the tray storing the recording sheet of the size, the output tray for ejecting the recording sheet on which the image is formed and the information attachment device 51 in which the data is written, the copying volume, the way of use of sorters in copying and so forth are displayed for providing directions. The directions which the user inputs from the display screen are transmitted to the document outputting component 8 as the image writing starting direction signal, the sheet feeding tray selecting direction signal and the output tray selecting direction signal through the system controlling component 10, and sent to the information attachment device outputting component 9 as the information attachment device writing starting direction signal and the information attachment device output tray selecting direction signal.

Figure 7:
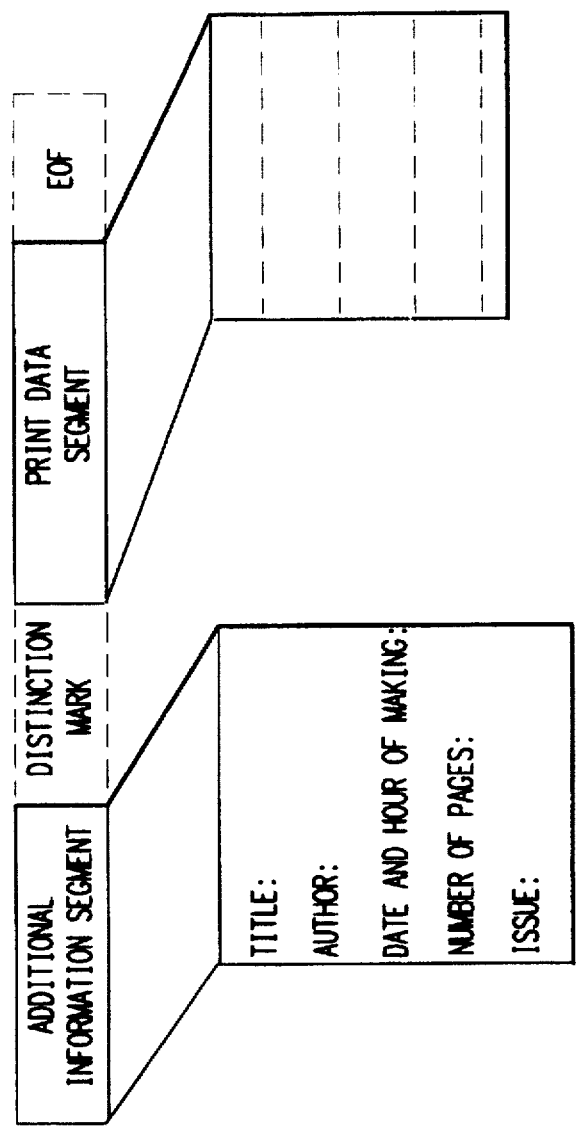
FIG. 7 shows an example of the construction of input data.

FIG. 7 shows an example of data read by the external data inputting component 2 or the information attachment device reading component 3.

The data contains an additional information segment storing additional information data such as a title, an author or the like, and a print data segment storing print data (image data) for forming an image on a recording sheet. Each segment is distinguished from another by a distinction mark and a terminal symbol (EOF) terminates the data. If the data of such format is transmitted from the external data inputting component 2 or the information attachment device reading component 3, the data separating component 5 transmits the additional information data located before the distinction mark to the information attachment device data editing component 7 and the print data subsequent to the distinction mark to the print data editing component 6, as described later.

Figure 8:
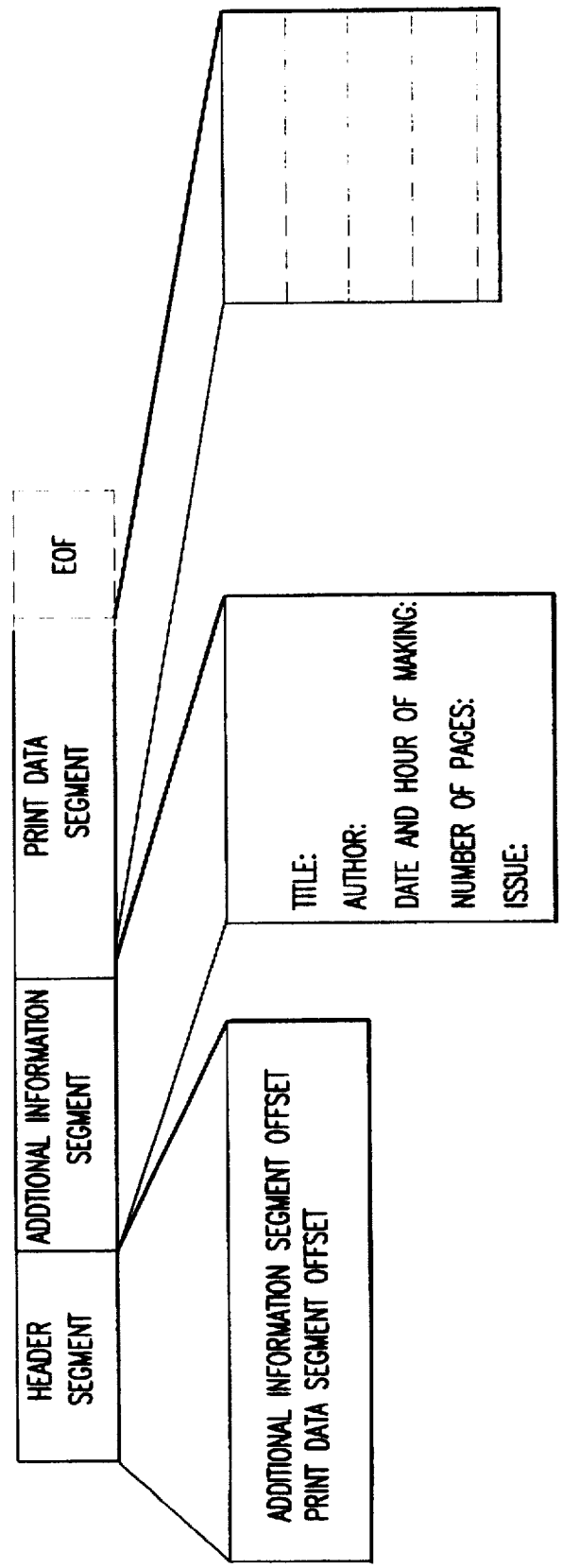
FIG. 8 shows another example of the construction of the input data.

FIG. 8 shows another example of data read by the external data inputting component 2 or the information attachment device reading component 3.

The data stores offset in data of the additional information segment and the print data segment in the header segment located at the top, and the data from the additional information segment offset to before the print data segment offset is transmitted to the information attachment device data editing component 7 and the data from the print data segment offset to the terminal symbol (EOF) is transmitted to the print data editing component 6.

A data separating process is now described which is executed on the inputting data of the construction as described above in a data inputting process which is explained later.

Figure 9:
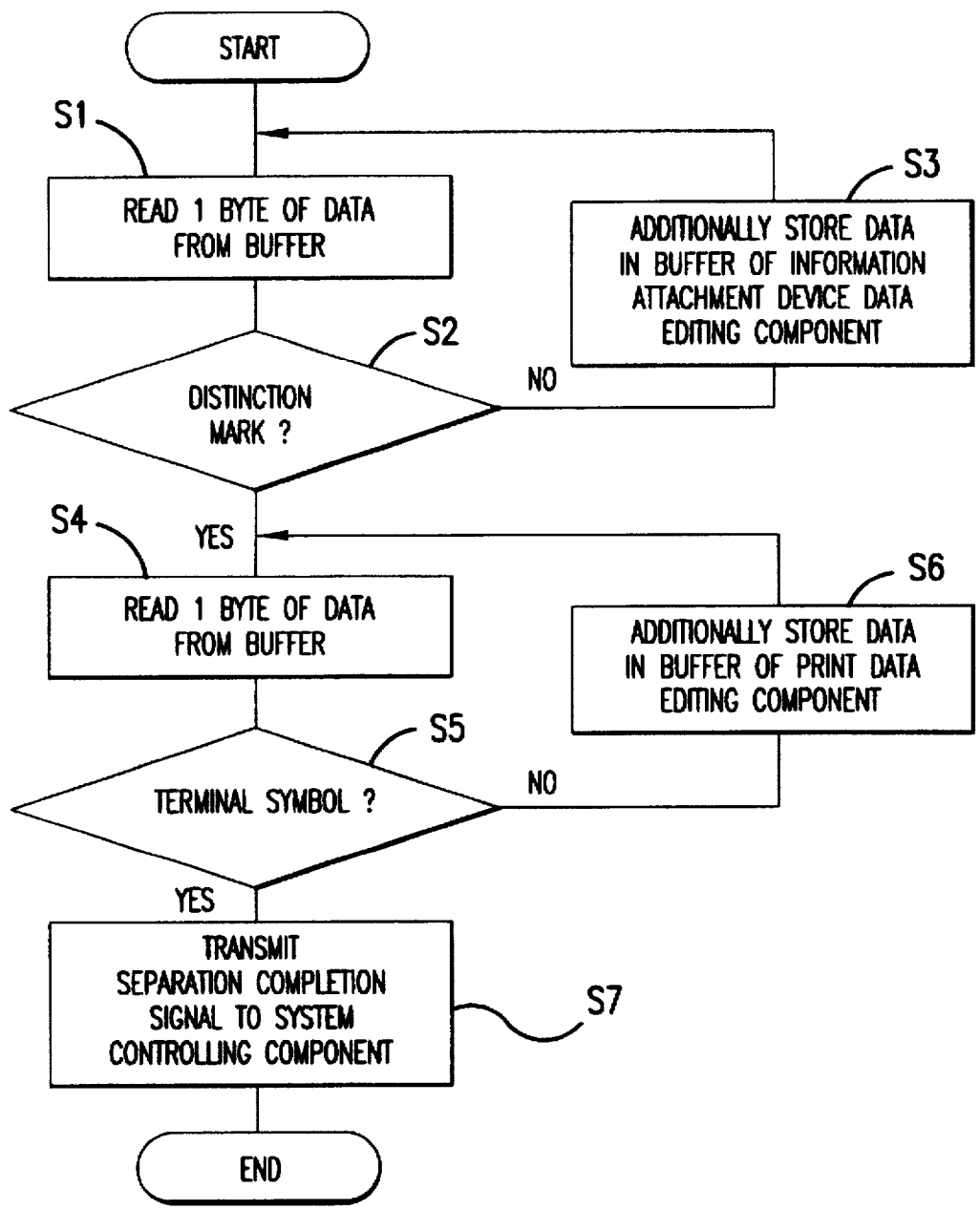
FIG. 9 is a flow chart showing an example of procedures of a data separating process.

FIG. 9 shows procedures of the data separating process executed by the data separating component 5 when the data having construction as shown in FIG. 7 is inputted from the external data inputting component 2 or the information attachment device reading component 3.

On receiving a separating process starting signal from the system controlling component 10, the data separating component 5 reads 1 byte of data from its buffer (step 1), and determines whether the read data is the distinction mark or not (step 2). If the data is not the distinction mark, the read data is additionally stored in a buffer of the information attachment device data editing component 7 (step 3), and data are sequentially read from the buffer of the data separating component 5 and the above process is repeated until the distinction mark is read.

In the case where 1 byte of data which has been read is the distinction mark, the next 1-byte data is read (step 4) and it is determined whether the data is the terminal symbol or not (step 5). If the data is not the terminal symbol, the read data is additionally stored in a buffer of the print data editing component 6 (step 6), and the data are sequentially read from the buffer of the data separating component 5 and the above process is repeated until the terminal symbol is read. At the time when the terminal symbol is read, a separation completion signal is transmitted to the system controlling component 10, thus the data separating process is completed (step 7).

Consequently, the inputted data is separated by the data separating process. The data stored in the additional information segment is inputted to the information attachment device data editing component 7, and the data stored in the print data segment is inputted to the print data editing component 6.

Figure 10:
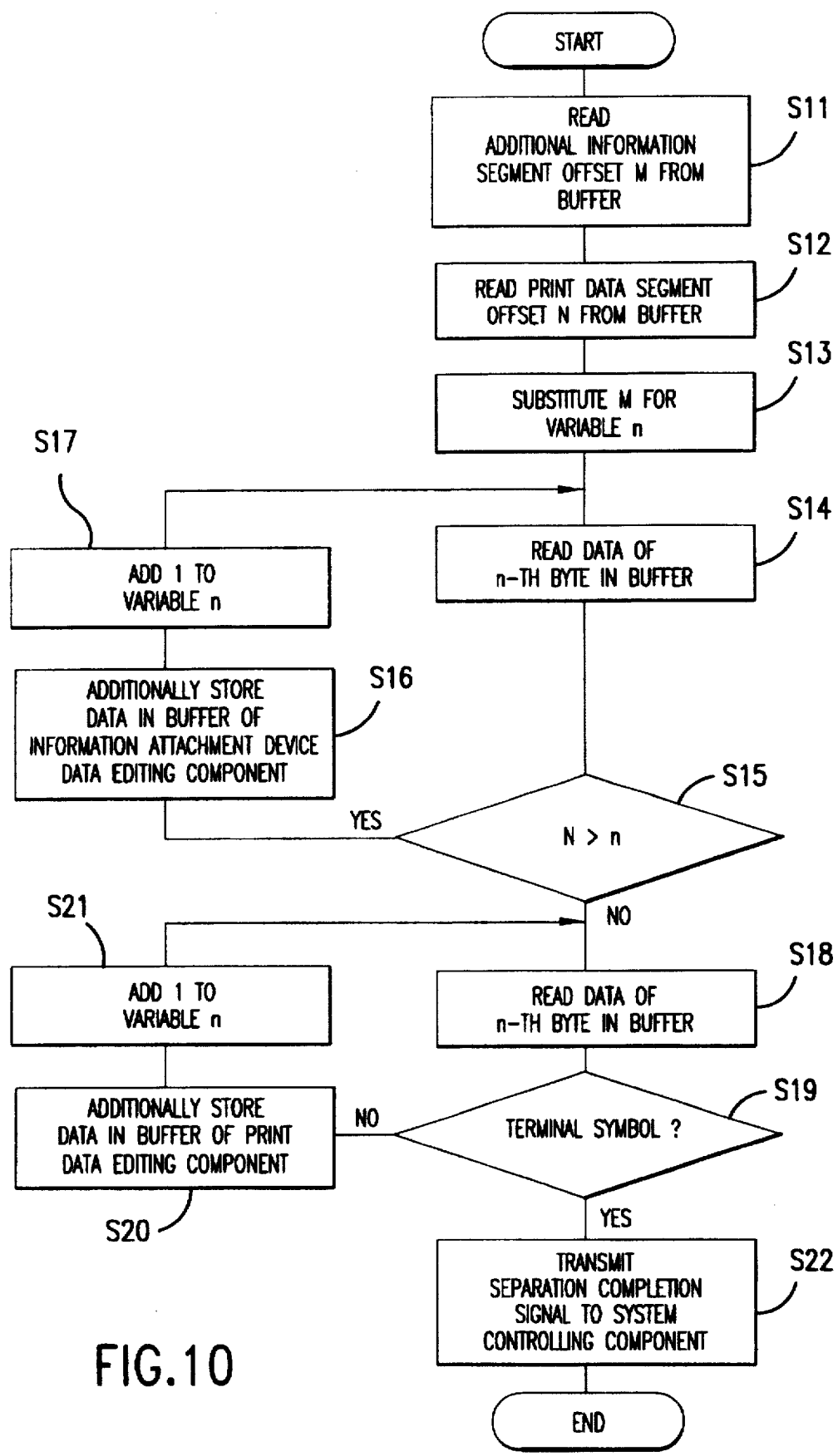
FIG. 10 is a flow chart showing another example of procedures of the data separating process.

FIG. 10 shows procedures of the data separating process executed by the data separating component 5 in the case where the data having the construction as shown in FIG. 8 is inputted from the information attachment device reading component 3 or the external data inputting component 2.

On receiving the separating process starting signal from the system controlling component 10, the data separating component 5 reads the additional information segment offset (step 11) and further reads the print data segment offset (step 12) from its buffer. For convenience in explanation, it is assumed that the additional information segment offset which has been read is M and the print data segment offset which has been read is N.

Then the additional information segment offset M is substituted for a variable n in the data separating component 5 which indicates the reading position in the buffer (step 13), and data of n-th byte in the buffer is read (step 14). It is determined whether the value of the variable n is larger than the print data segment offset N (step 15), and if the variable n is not larger than N, the data read from the buffer is additionally stored in the buffer of the information attachment device data editing component 7 (step 16) and 1 is added to the variable n (step 17).

In the case where the value of the variable n is not less than the print data segment offset N, the data of n-th byte is read from the buffer (step 18) and it is determined whether the read data is the terminal symbol or not (step 19). If the read data is not the terminal symbol, the read data is additionally stored in the buffer of the print data editing component 6 (step 20), and then 1 is added to the variable n (step 21). At the time when the terminal symbol is read, the separation completion signal is transmitted to the system controlling component 10, thus the data separating process is completed (step 22).

Consequently, in this data separating process, the inputted data is also separated. The data stored in the additional information segment is inputted to the information attachment device data editing component 7 and the data stored in the print data segment is inputted to the print data editing component 6.

In the current embodiment, if the starting direction is inputted by the input direction component 4 or it is detected that data is transmitted to the external data inputting component 2 from the outside, the preprocess, inputting process and the outputting process are executed in this order under the control of the system controlling component 10. If the editing starting direction is inputted from the direction inputting component 4, the preprocess, editing process and outputting process are executed in this order provided that the document data is already inputted, and the preprocess, inputting process, editing process and outputting process are executed in this order provided that the document data is not inputted yet.

That is, if the starting direction for inputting is provided by the user, the system controlling component 10 transmits the starting direction signal for data inputting to the document inputting component 1 or the information attachment device reading component 3 depending on the type of the document data to be read. If the plural document data are inputted, the starting direction signal for data inputting is transmitted according to a predetermined priority order or a direction for selecting by the user. If the data is inputted to the external data inputting component 2, the external data inputting component 2 notifies the system controlling component 10 that the data is inputted. The system controlling component 10 waits for the state capable of accepting the data inputting, and when the state becomes available, the starting direction signal for inputting is transmitted to the external data inputting component 2.

Figure 11:
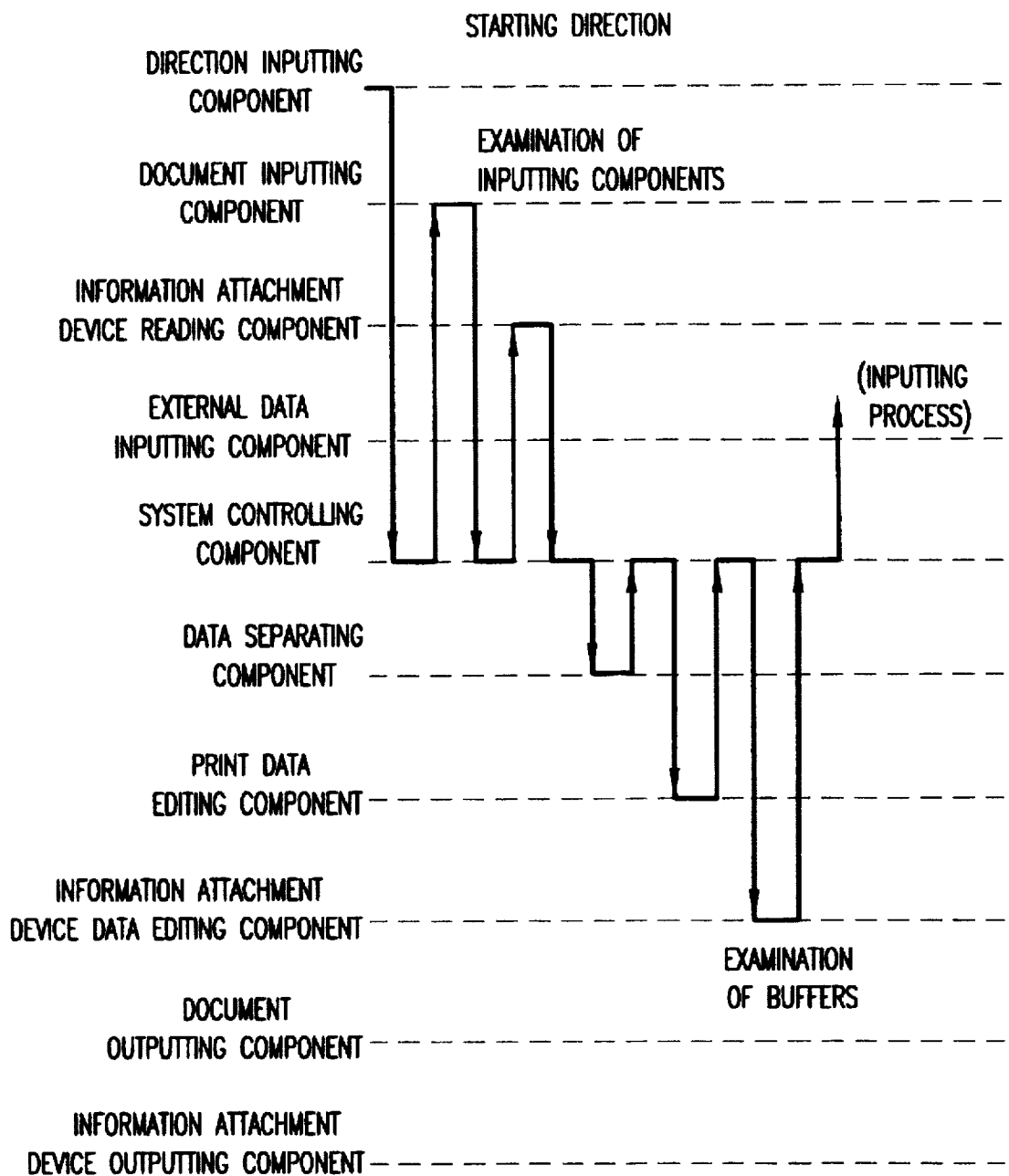
FIG. 11 is a timing chart showing an example of a preprocess executed in the case where a starting direction is inputted.

FIG. 11 is a timing chart of a preprocess executed in the case where the starting direction is inputted.

When the starting direction is inputted by the direction inputting component 4, the system controlling component 10 examines the document inputting component 1 and the information attachment device reading component 3 to determine which component the data to be inputted is read from. After determining the component, it is confirmed that the buffer of each of the data separating component 5, print data editing component 6 and information attachment device data editing component 7 is empty and not in processing, and thereby the preprocess is completed and the process is proceeded to the inputting process by the system controlling component. If there is data in the buffer and the data is under processing, the process is not proceeded to the inputting process until processing of the data is completed and the buffer becomes empty.

Figure 12:
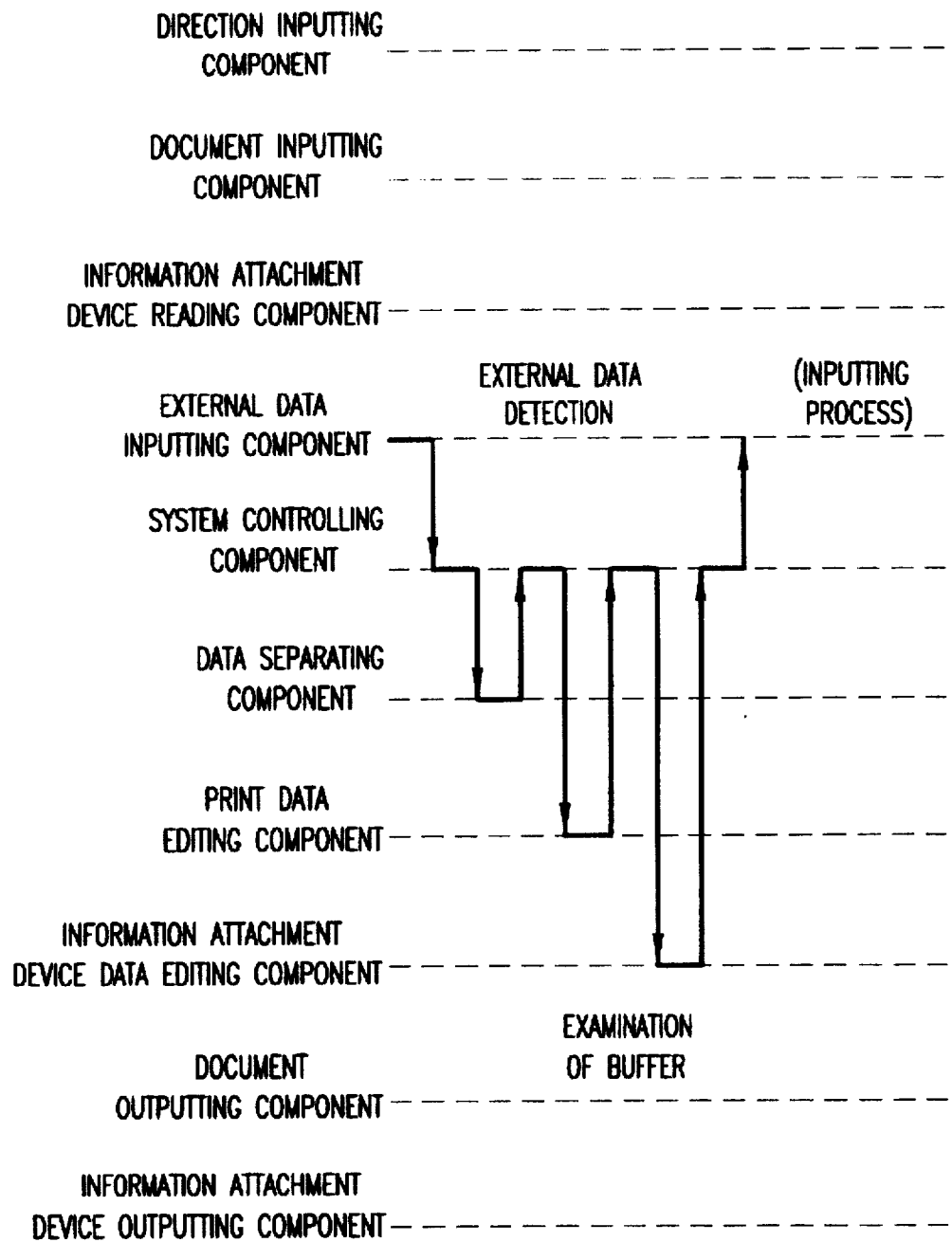
FIG. 12 is a timing chart showing an example of a preprocess executed in the case where external data is detected.

FIG. 12 shows a timing chart of a preprocess executed in the case where external data is detected.

If an external data detecting signal is transmitted by the external data inputting component 2, the system controlling component 10 confirms that the buffer of each of the data separating component 5, print data editing component 6 and information attachment device data editing component 7 is empty and not in processing, and then the preprocess is completed and the process is proceeded to the inputting process by the system controlling component. If there is data in the buffer and the data is under processing, the the process is not proceeded to the inputting process until processing of the data is completed and the buffer becomes empty.

Figure 13:
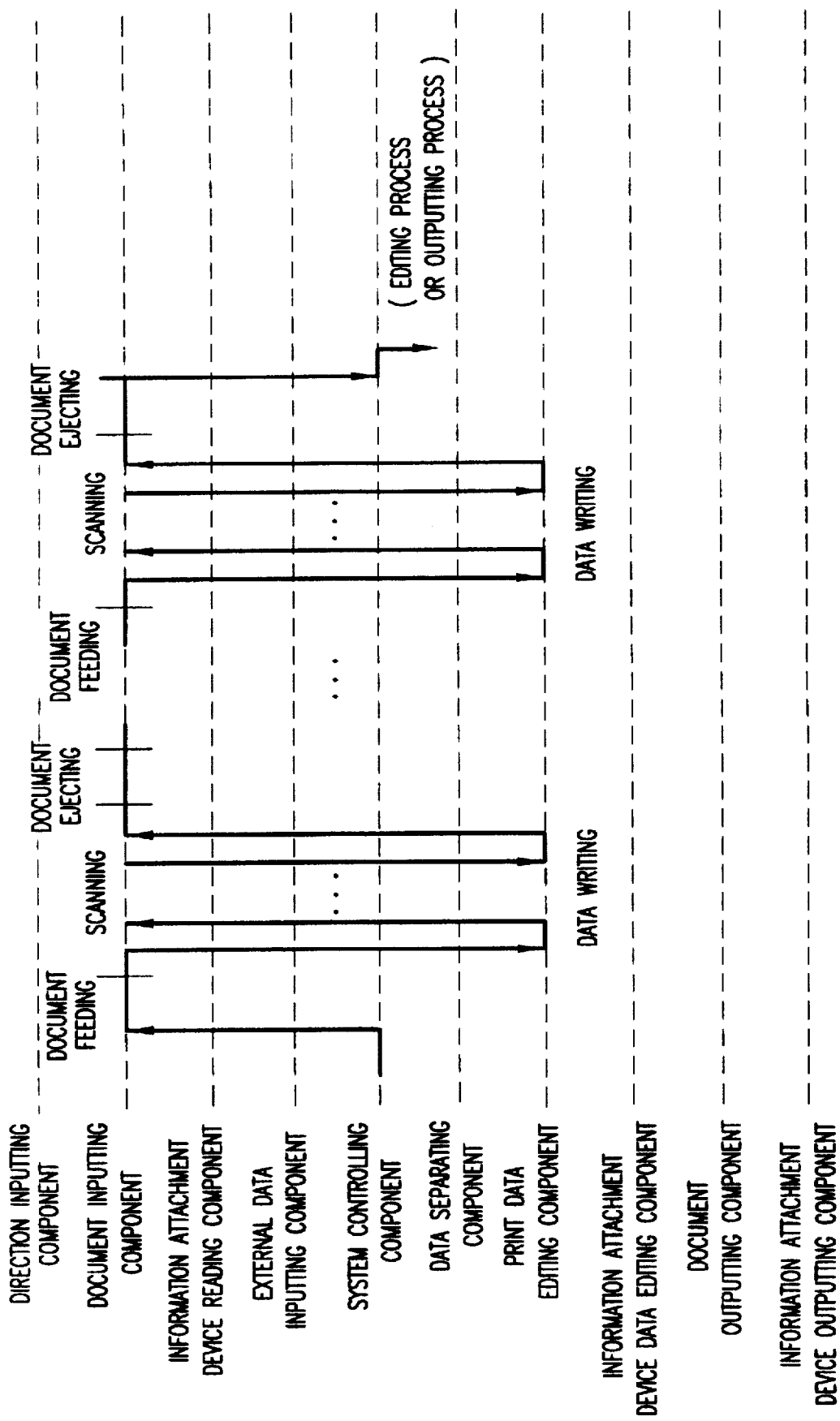
FIG. 13 is a timing chart showing an example of an inputting process executed in the case where document data is read by a document inputting component.

FIG. 13 is a timing chart of the inputting process executed in the case where the data is read by the document inputting component 1.

When the inputting starting signal is transmitted from the system controlling component 10, the document inputting component 1 forwards a sheet of the document from the document stand to the platen 22, and reads the contents of the document and writes the document data which has been read in the buffer of the print data editing component 6. As reading the contents of the document on the platen 22 is completed, the document is forwarded to the document ejection tray 24. The above process is repeated until no document remains on the document stand 21, and at the time when all documents on the document stand 21 are forwarded, an inputting completion signal is transmitted to the system controlling component 10, and thereby the process is proceeded to the editing process or outputting process by the system controlling component 10.

Figure 14:
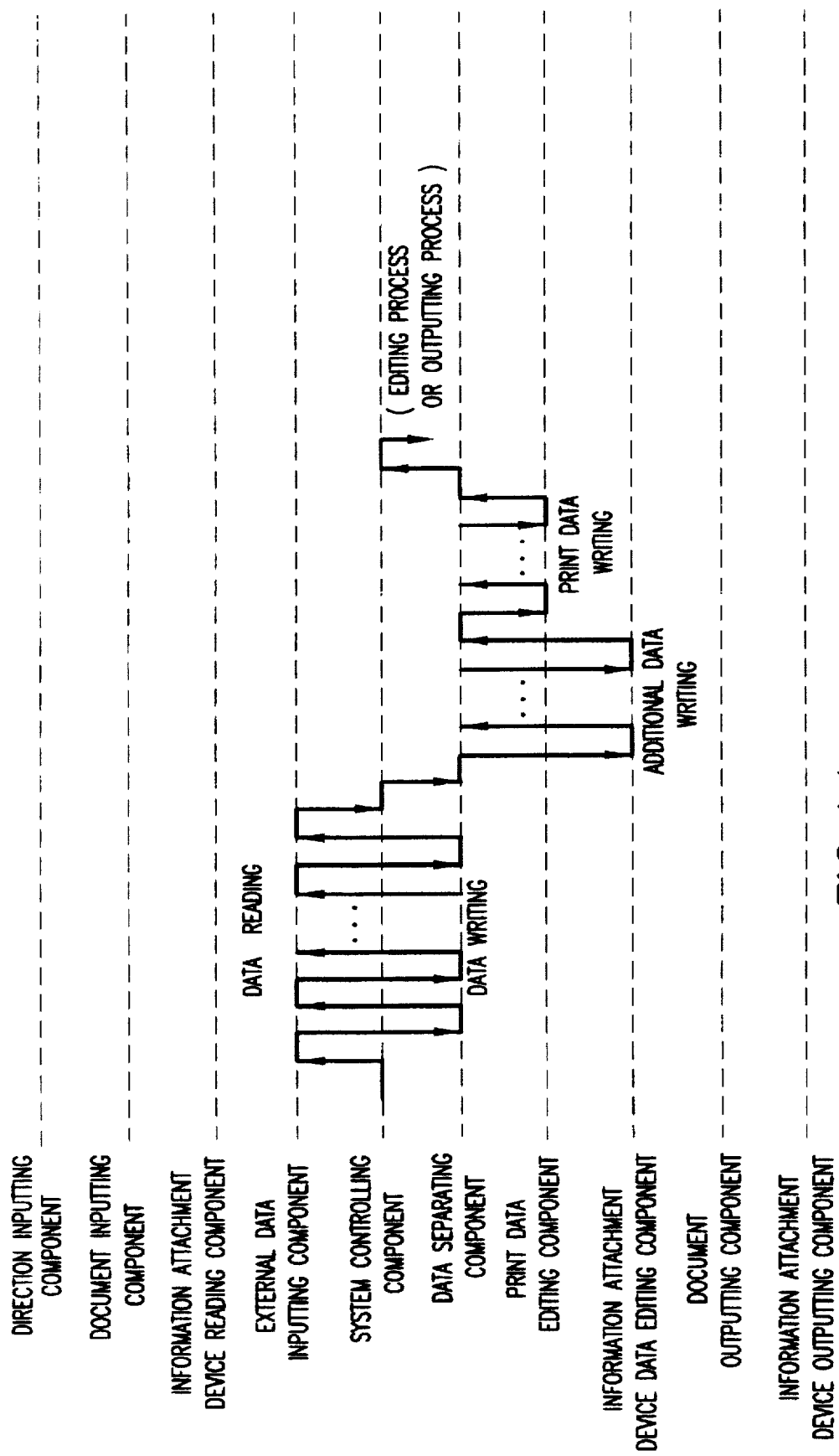
FIG. 14 is a timing chart showing an example of the inputting process executed in the case where document data is inputted by a data inputting component.

FIG. 14 is a timing chart of the inputting process executed in the case where the data is inputted by the external data inputting component 2.

When the inputting starting signal is transmitted from the system controlling component 10, the external data inputting component 2 starts to receive the data from the outside, and writes the received data in the buffer of the data separating component 5. This process is repeated until all the data are received, and the inputting completion signal is transmitted to the system controlling component 10 when all data are received.

On receiving the inputting completion signal from the external data inputting component 2, the system controlling component 10 transmits the separating process starting signal to the data separating component 5. As the separating process starting signal is received, the data separating component 5 reads the additional information data which is not formed as an image on the recording sheet from the data in the buffer, and writes it in the buffer of the information attachment device data editing component 7. Then the data separating component 5 reads the print data which is the information for forming an image on the recording sheet from the data in the buffer, and writes it in the buffer of the print data editing component 6. When the separating process of the data in the buffer by the data separating component 5 is completed, the inputting completion signal is transmitted to the system controlling component 10, thus the process is proceeded to the editing process or outputting process by the system controlling component 10.

In the current embodiment, the additional information data is read first and then the print data is read, but there occurs no problem if the print data is processed earlier or if these data are simultaneously processed.

Figure 15:
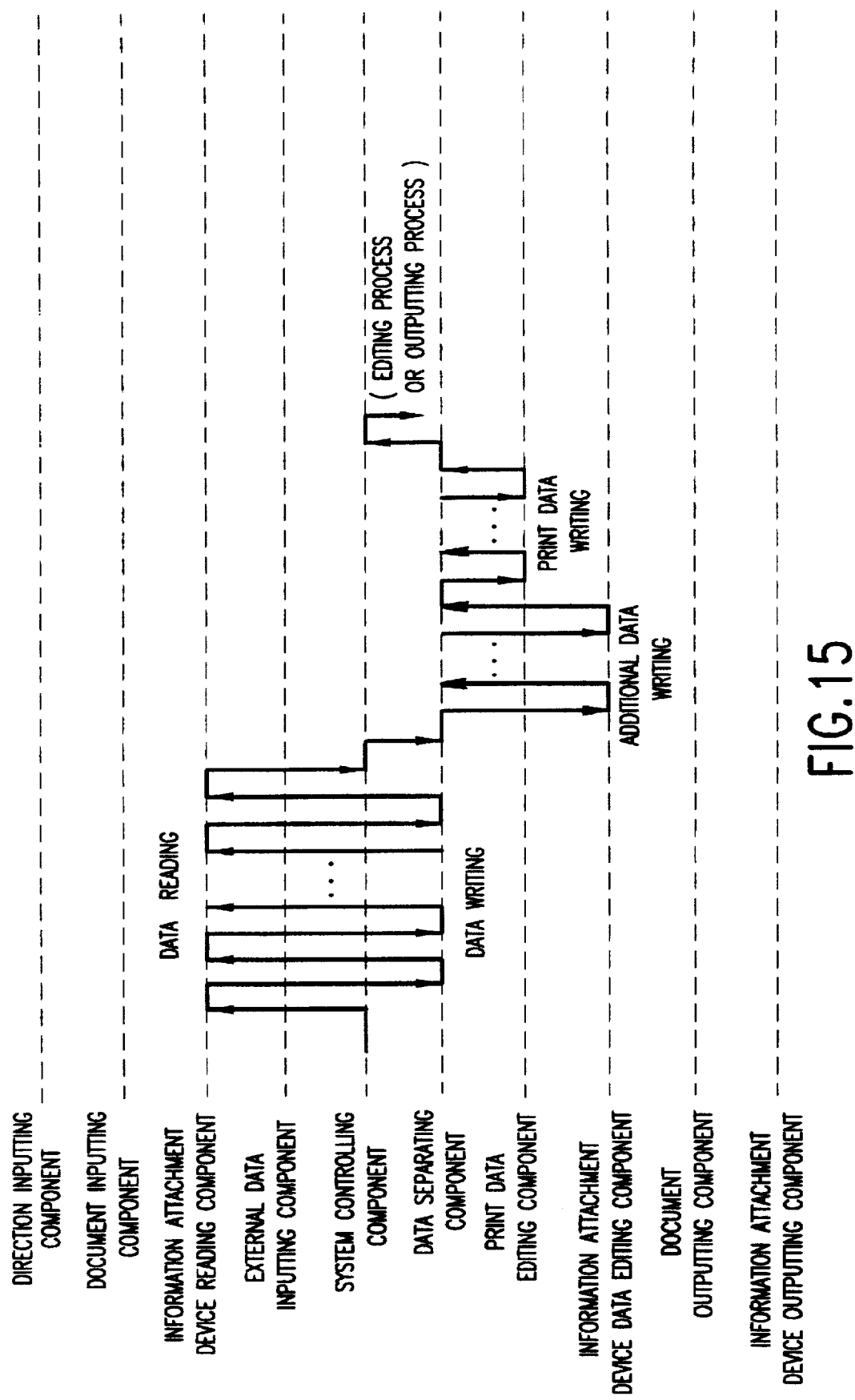
FIG. 15 is a timing chart showing an example of the inputting process executed in the case where document data is inputted by an information attachment device reading component.

FIG. 15 is a timing chart showing the inputting process executed in the case where the data is inputted by the information attachment device reading component 3.

When the inputting starting signal is transmitted by the system controlling component 10, the information attachment device reading component 3 reads data from the information attachment device 13 (51) and writes it in the buffer of the data separating component 5. This process is repeated until all data in the information attachment device are read, and then the inputting completion signal is transmitted to the system controlling component 10.

On receiving the inputting completion signal from the information attachment device reading component 3, the system controlling component 10 transmits the separating process starting signal to the data separating component 5. On receiving the separating process starting signal, the data separating component 5 reads the additional information data which is the information not to be formed as an image on the recording sheet from the data in the buffer, and writes it in the buffer of the information attachment device data editing component 7. Next, the data separating component 5 reads the print data which is the information for forming the image on the recording sheet from the data in the buffer, and writes it in the buffer of the print data editing component 6. When the separating process of the data in the buffer by the data separating component 5 is completed, the inputting completion signal is transmitted to the system controlling component 10, thus the process is proceeded to the editing process or outputting process by the system controlling component 10.

In the current embodiment, the additional information data is read first and then the print data is read, but there occurs no problem if the print data is processed earlier or if these data are simultaneously processed.

Here, if the editing direction is provided by the user, the system controlling component 10 examines whether there are any data already inputted to the buffers of the print data editing component 6 and the information attachment device data editing component 7. If there is no data, the starting direction signal is transmitted to the document inputting component 1 or the information attachment device reading component 3 depending on the type of data to be read. If there are plural data in the buffer, the starting direction signal for inputting is transmitted according to the predetermined priority order or the direction for selecting by the user. After completing the data reading, the system controlling component 10 provides the starting direction for editing to the print data editing component 6 and the information attachment device data editing component 7.

Figure 16:
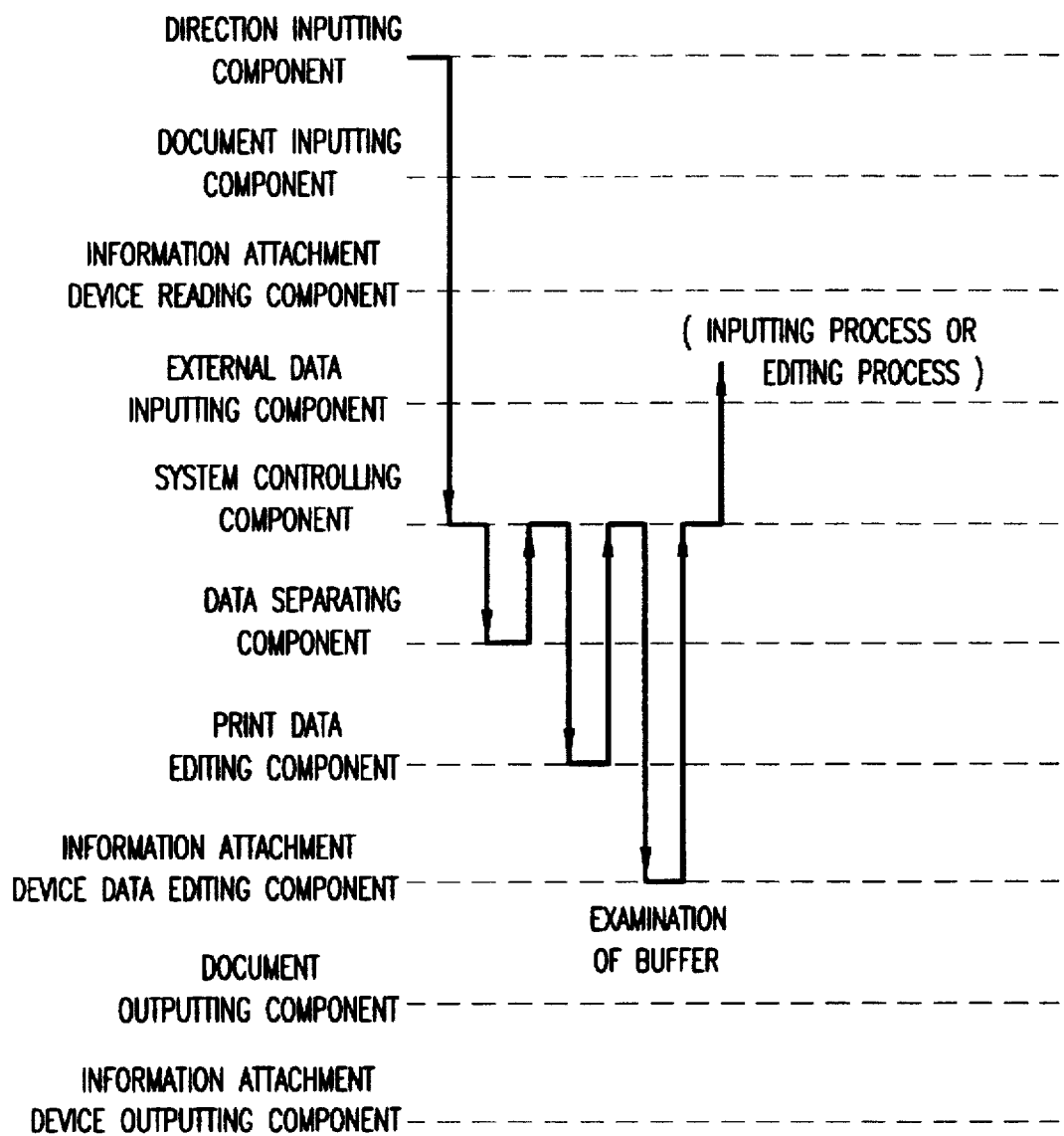
FIG. 16 is a timing chart showing an example of a preprocess executed in the case where a direction of editing is inputted.

FIG. 16 is a timing chart of the preprocess executed in the case where the direction for editing is inputted.

As the editing starting direction is inputted from the direction inputting component 4, the system controlling component 10 examines whether the buffer of each of the data separating component 5, print data editing component 6 and information attachment device data editing component 7 is empty or not. If each buffer is empty, the preprocess and inputting process which are the same as those in the case where the starting direction is inputted by the direction inputting component 4 are carried out and then the editing process is executed. If the buffers are not empty, the editing process is immediately executed.

Figure 17:
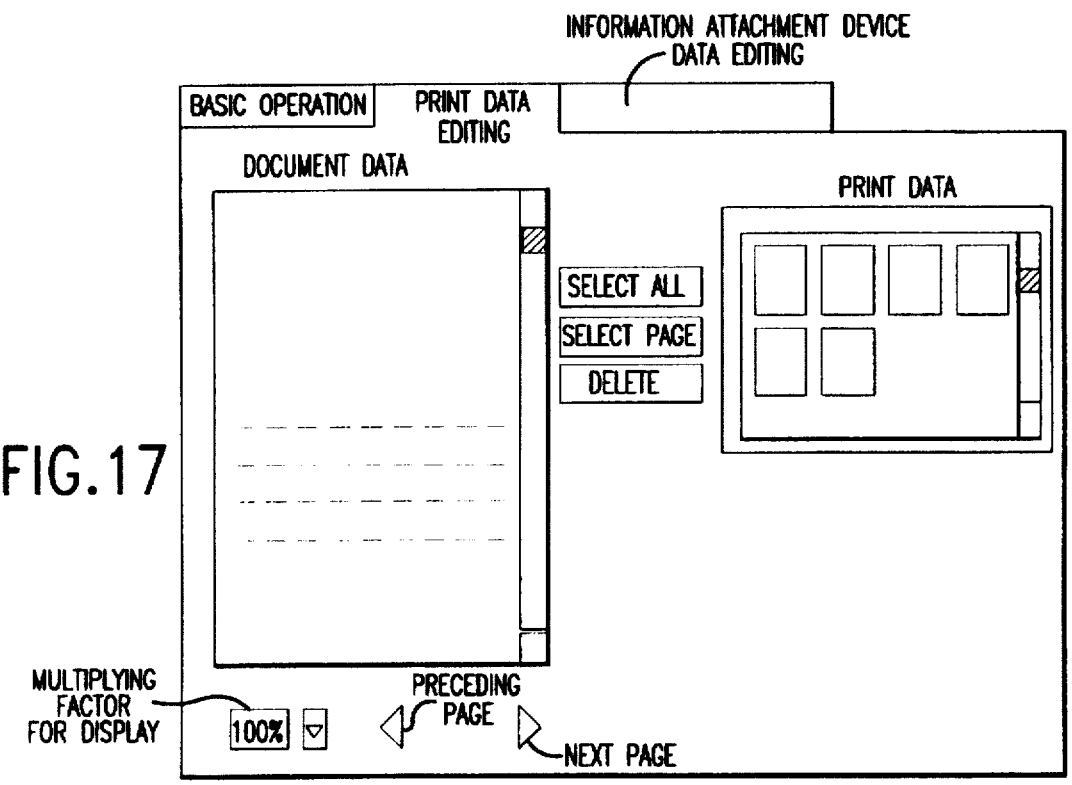
FIG. 17 shows an example of a print data editing screen in a direction inputting component.

FIG. 17 shows an example of a print data editing screen of the direction inputting component 4.

The data inputted to the print data editing component 6 through the system controlling component 10 is displayed in the document data display part with the specified multiplying factor. If the multiplying factor so small that plural pages can be displayed in a screen, the plural pages are simultaneously displayed.

If it is directed that all inputted pages are to be printed or that only the specified pages are to be printed, the pages to be printed are contracted and displayed in the print data display part located in the right side of the screen. It is possible to provide a direction for changing the printing order by dragging the contracted pages. Here, the information about which pages are selected and the directed printing order are sent to the print data editing component 6 through the system controlling component 10, and accordingly the print data editing component 6 reads the data of the specified pages in the directed order and transmits them to the document outputting component 8.

Figure 18:
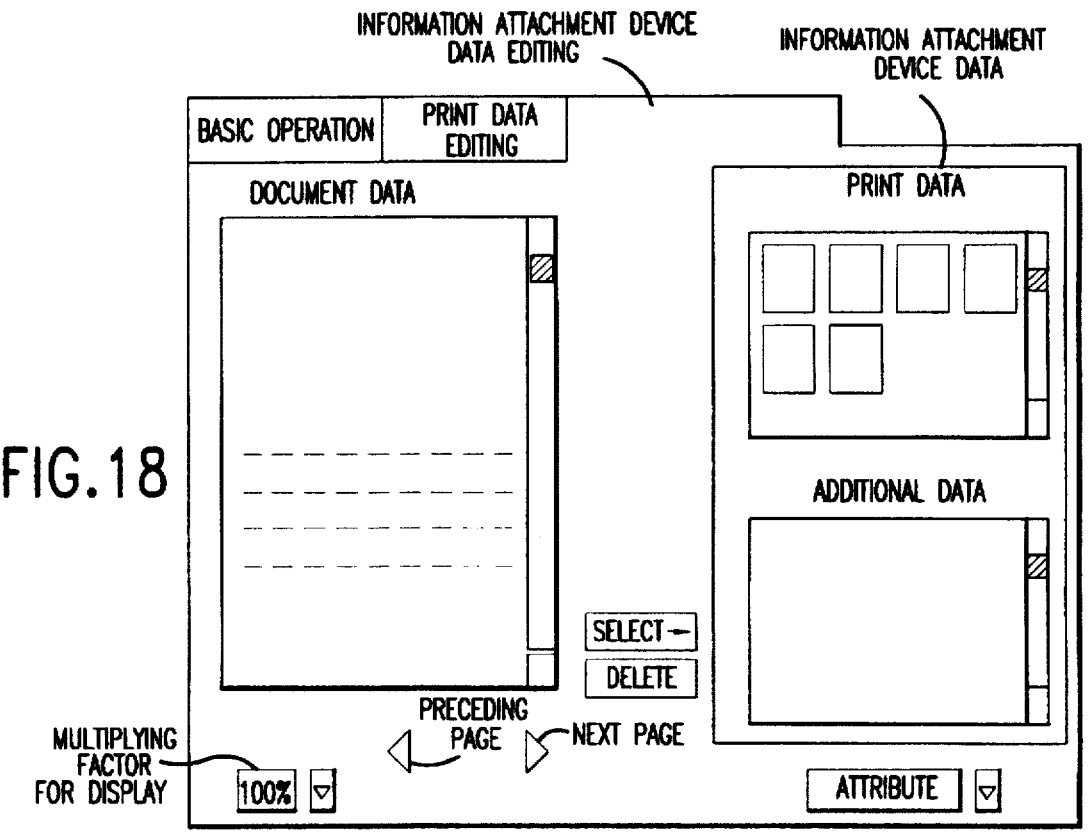
FIG. 18 shows an example of an information attachment device data editing screen.
Figure 19:
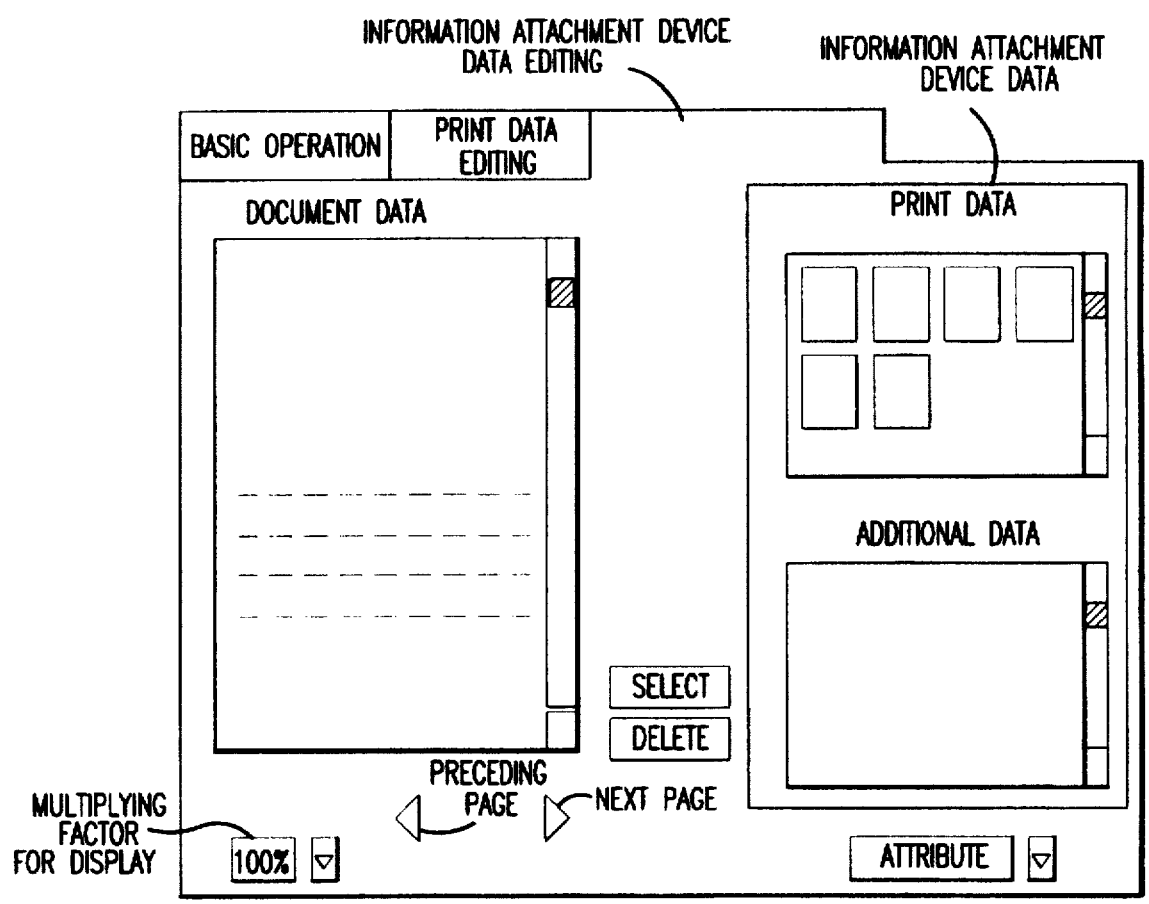
FIG. 19 shows another example of the information attachment device data editing screen.

FIGS. 18 and 19 show an example of the information attachment device data editing screen. As previously described, the information attachment device data consists of the print data and the additional information data, and the print data edited by the print data editing component 6 is displayed in the top-right area of the screen, and the additional information data is displayed in the bottom-right area of the screen.

The additional information data may be specified by selecting a part of the document data displayed in the left side of the screen, and it may be also possible to display a virtual keyboard or the like (not shown in the figure), whereby the user inputs the data. At that time, attributes can be added to the directed part, and these directions are transmitted to the information attachment device data editing component 7 through the system controlling component 10. In the case where a part of the document data is specified and the document data is the code information such as PDL, the information attachment device data editing component 7 extracts the code. If the specified part of the document data remains as it was, namely, the image data read by the document inputting component 1, the image of the area corresponding to the specified part is extracted to be the additional information data. The character recognition can be executed on the extracted image data, and then it is converted into the code to be the additional information data.

FIG. 19 shows an example of the screen display of the case where a part of the document data is selected and an attribute "organization" is specified. The information attachment device data edited in accordance with the direction is transmitted to the information attachment device outputting component 9 and stored in the information attachment device 15 (51) which is then ejected to the outside of the apparatus. At that time, it may be possible that information related to copying, for example, the date and hour of copying, the machine number, copying volume, the serial number or the like, is automatically added as the additional information data.

Figure 20:
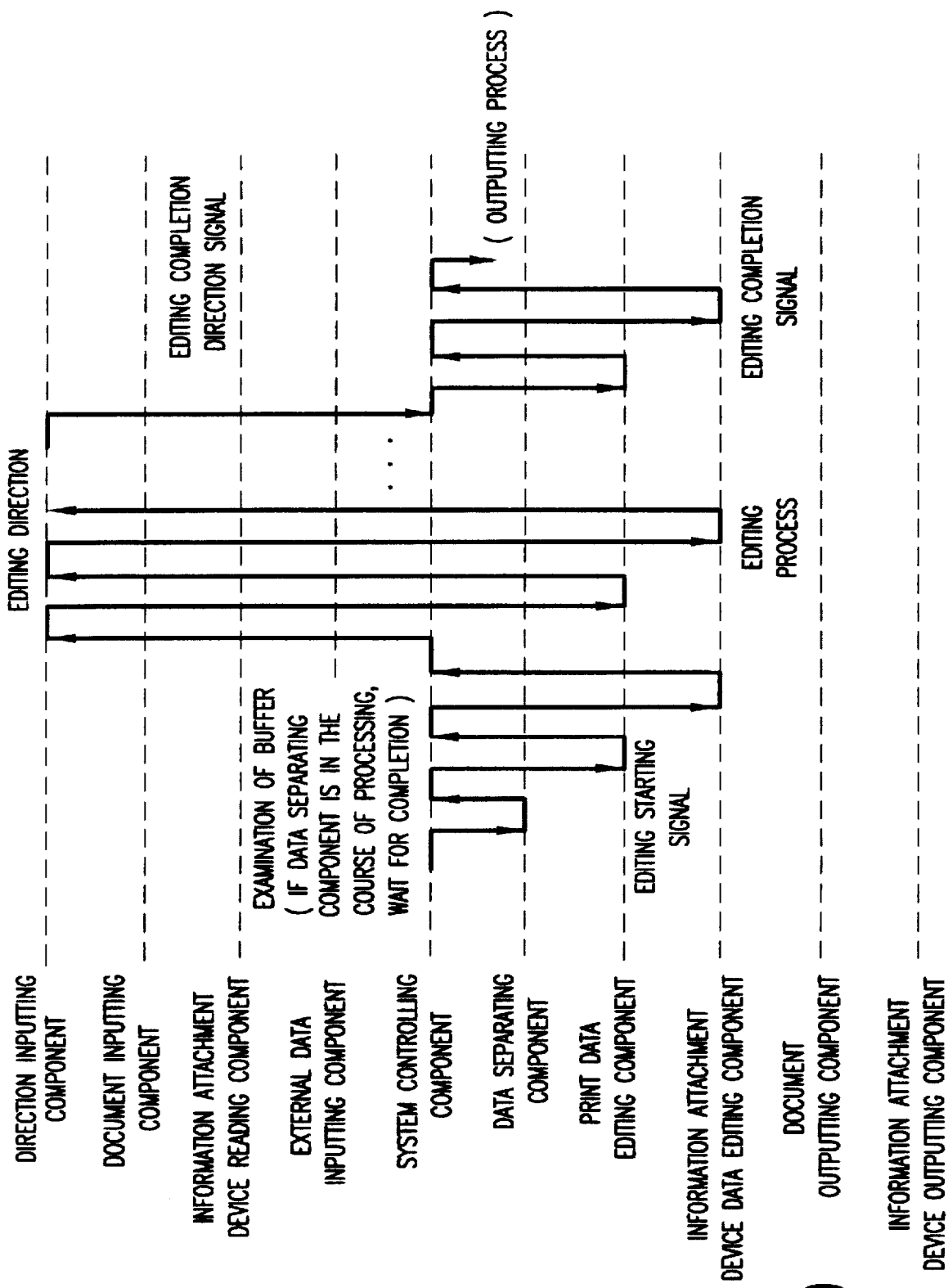
FIG. 20 is a timing chart showing an example of an editing process.

FIG. 20 is a timing chart of the editing process.

As the system controlling component 10 examines the buffer of each of the data separating component 5, print data editing component 6 and the information attachment device data editing component 7 and confirms that the buffer of the data separating component 5 is empty and not in processing, the system controlling component 10 transmits the editing starting signal to the print data editing component 6 and the information attachment device data editing component 7. If the buffer of the data separating component 5 is in the course of the separating process, the system controlling component 10 waits for completion of the separating process, and as the process is completed, the editing starting signal is transmitted to the print data editing component 6 and the information attachment device data editing component 7.

When the print data editing component 6 and the information attachment device data editing component 7 come into the state capable of editing, the editing starting signal is transmitted to the direction inputting component 4 for accepting the editing direction from the user. The editing direction provided by the direction inputting component 4 is sent to the print data editing component 6 and the information attachment device data editing component 7, and therefore the editing process according to the direction is carried out.

As the editing completion direction is transmitted from the direction inputting component 4 to the system controlling component 10, the system controlling component 10 transmits the editing completion signal to the print data editing component 6 and the information attachment device data editing component 7, thus the process is proceeded to the outputting process by the system controlling component 10.

Figure 21:
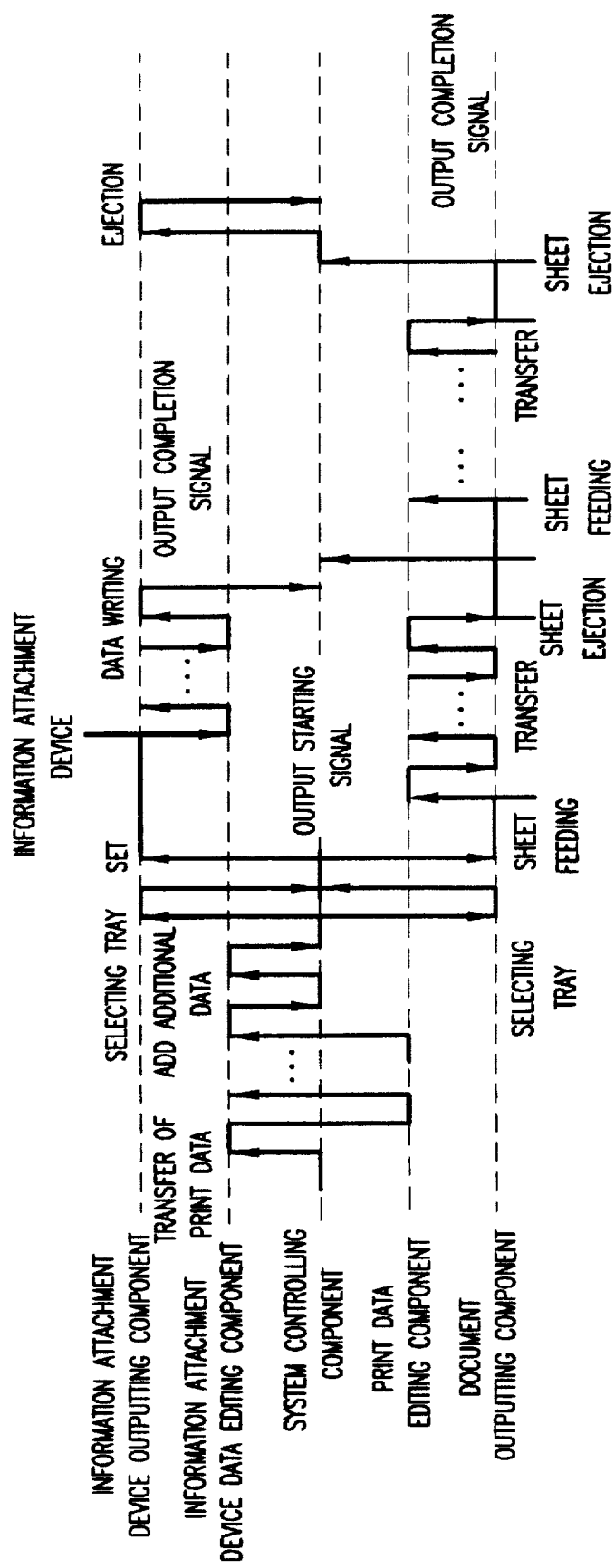
FIG. 21 is a timing chart showing an example of an outputting process.

FIG. 21 is a timing chart of the outputting process.

After completion of the inputting process executed by the starting direction or the editing process executed by the editing direction, the system controlling component 10 transmits a print data transfer signal to the information attachment device data editing component 7. On receiving the print data transfer signal, the information attachment device data editing component 7 reads the print data from the buffer of the print data editing component and adds it to the information attachment device data. After completing addition of the print data, an additional information data request signal is transmitted to the system controlling component 10. On receiving the additional information data request signal, the system controlling component 10 transmits the additional information data such as the machine number, copying volume, the date and hour of copying and the serial number to the information attachment device data editing component 7. Then the information attachment device data editing component 7 adds the received additional information data to the additional information data which has already been stored in the buffer.

After the addition of such additional information data is completed, the information attachment device data editing component 7 transmits the editing completion signal to the system controlling component 10, and on receiving the editing completion signal, the system controlling component 10 transmits the information attachment device output tray selection signal and the document output tray selection signal to the information attachment device outputting component 9 and the document outputting component 8, respectively. The information attachment device outputting component 9 and the document outputting component 8 set the output tray corresponding to the received information attachment device output tray selecting signal and document output tray selecting signal, respectively, and then transmit the information attachment device output tray selection completion signal and the document output tray selection completion signal to the system controlling component 10.

On receiving the information attachment device output tray selection completion signal, the system controlling component 10 transmits the output starting signal to the information attachment device outputting component 9, while transmitting the output starting signal to the document outputting component 8 on receiving the document output tray selection completion signal. As the output starting signal is received, the information attachment device outputting component 9 takes out an information attachment device 15 (51) from the information attachment device stack and sets it in the writing position, and then reads the information attachment device data from the buffer of the information attachment device editing component 7 and writes it in the information attachment device. At the time when the writing of all information attachment data is completed, the output completion signal is transmitted to the system controlling component 10.

On receiving the output starting signal, the document outputting component 8 takes out a recording sheet from the sheet feeding tray and forwards it to the image writing part, and forms an image of the data read from the buffer of the print data editing component 6 on the recording sheet forwarded to the image writing part and transfers it on the recording sheet. As the transfer of the 1 page of print data is completed, the recording sheet is forwarded to the output tray, whereby the recording sheet is ejected to the outside of the apparatus. This process is repeated until no print data remains, and when output of all print data is completed, the output completion signal is transmitted to the system controlling component 10.

On receiving the output completion signals from the information attachment device outputting component 9 and the document outputting component 8, the system controlling component 10 transmits the ejection signal to the information attachment device outputting component 9 to eject the information attachment device 15 (51) in which the data is written to the tray to which the recording sheet has also been ejected. After ejecting the information attachment device in which the data is written to the information attachment device ejecting tray, the information attachment device outputting component 9 transmits the ejection completion signal to the system controlling component 10.

As described above, the recording sheet on which the document data is formed as an image and the information attachment device 15 (51) which stores the information attachment device data are synchronously ejected to the predetermined tray, thus data held in the different media are related to each other and ejected to the outside of the apparatus.

In FIG. 21, the output completion signal from the information attachment device outputting component is set to be transmitted earlier, but the order of receiving the output completion signals transmitted from the information attachment device outputting component 9 and the document outputting component 8 may be inverted.

Figure 23:
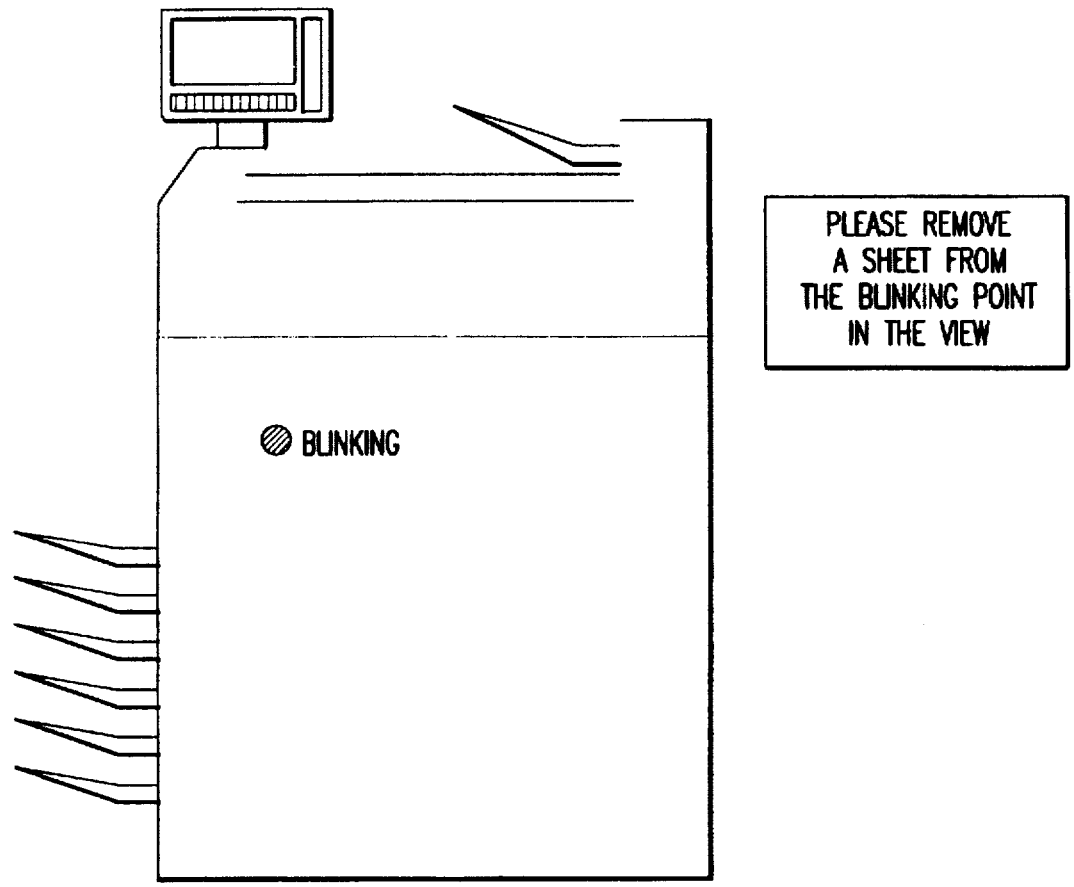
FIG. 23 shows an example of screen display in the direction inputting component when a recording sheet cannot be outputted.
Figure 24:
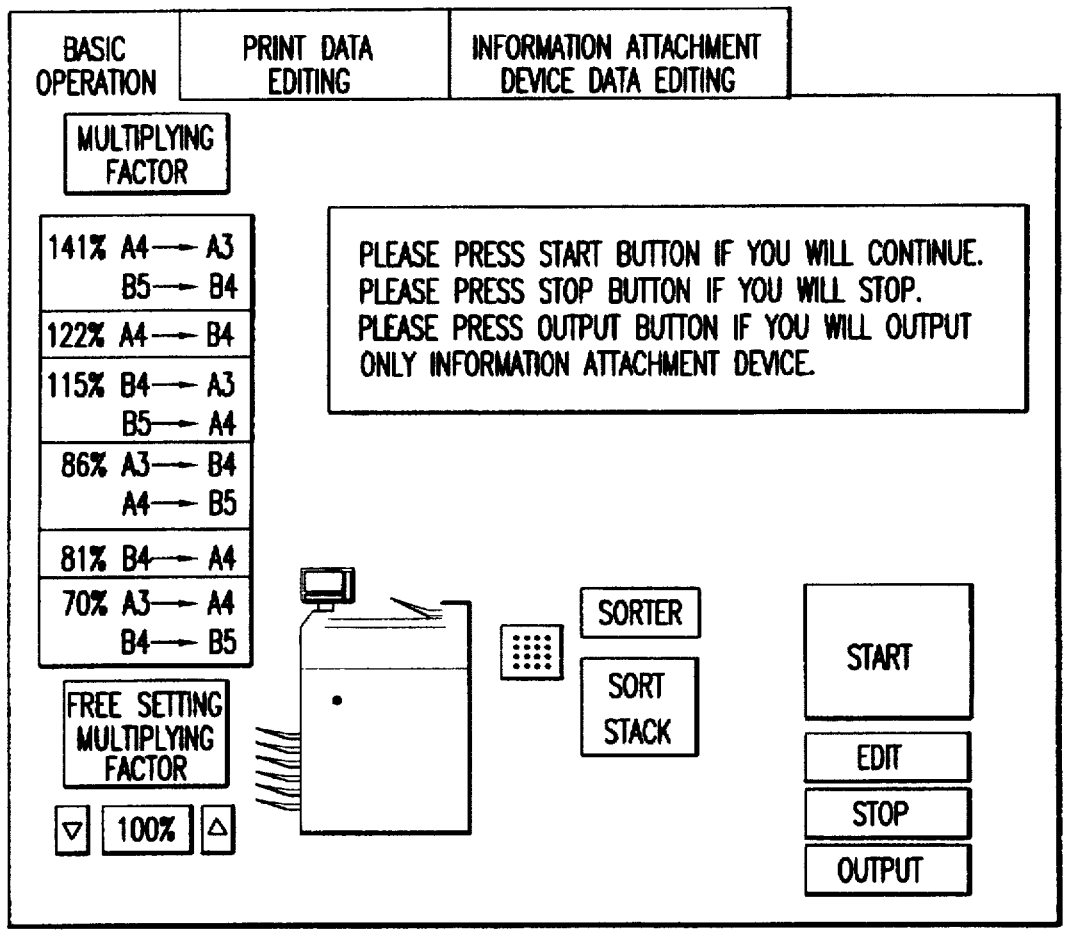
FIG. 24 shows an example of screen display in the direction inputting component in a process mode of taking corrective action against an error in outputting the recording sheet.

Next, a process executed in the case where it is impossible to output the recording sheet on which an image is formed because of the sheet jamming or running out of toner during the above-described outputting process is described with reference to FIGS. 22-24.

Figure 22:
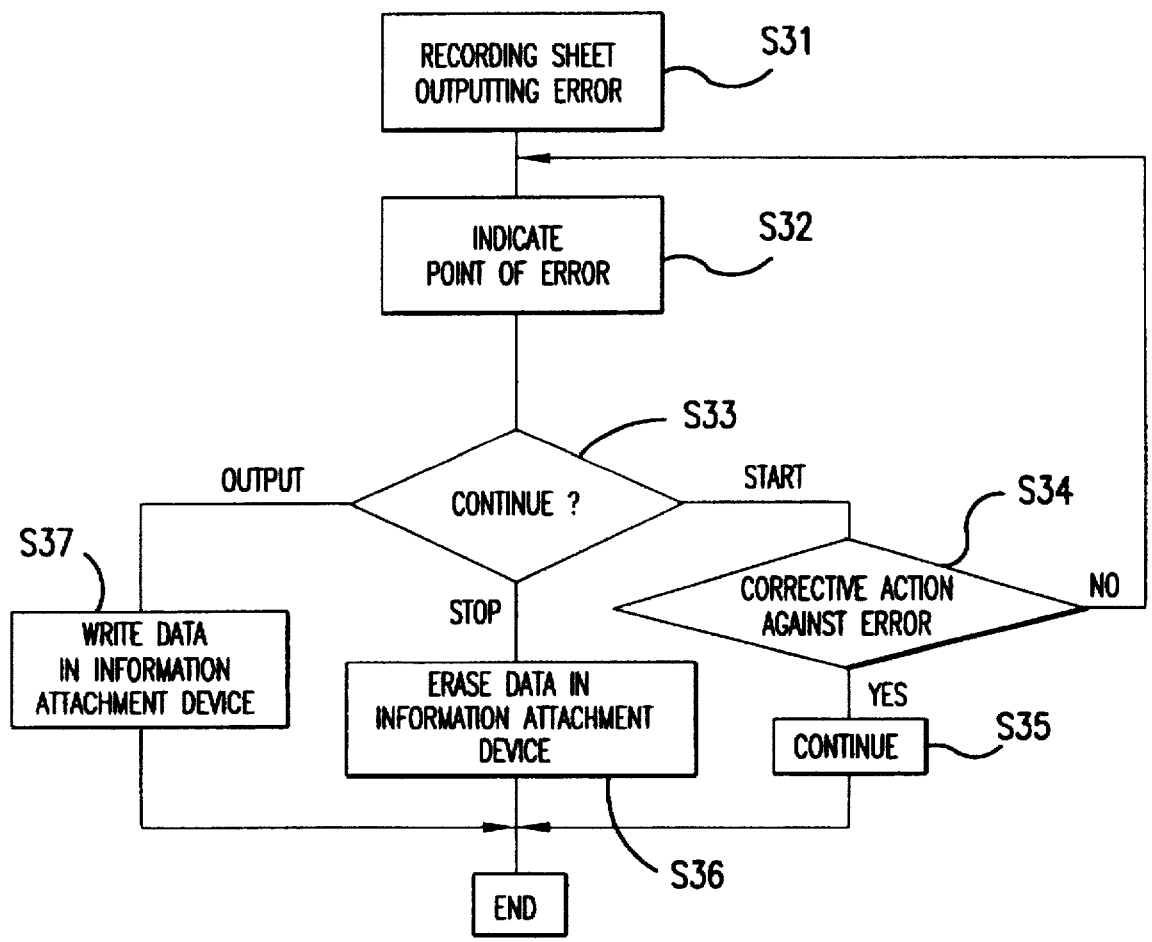
FIG. 22 is a flow chart showing an example of procedures of a process executed when a recording sheet cannot be outputted.

FIG. 22 shows procedures of the process. For example, if it is assumed that the sheet jamming occurs, the error is detected by a sheet jamming detecting sensor (not shown in the figure) (step 31). Then, as shown in FIG. 23, a schematic view of the information outputting apparatus is displayed on the display screen of the direction inputting unit 49 in which the point where the error occurs is indicated by blinking, and moreover, a message "Please remove a sheet from the blinking point in the view" is displayed (step 32).

Furthermore, to prompt the user to provide a direction after taking corrective action against error, the following messages are simultaneously displayed:

"Please press start button if you will continue.

Please press stop button if you will stop.

Please press output button if you will output only information attachment device."

As the user removes a jamming sheet and presses the start button (step 33), it is examined whether the sheet has been appropriately removed, that is, the corrective action against error has been taken or not (step 34). If the corrective action has been taken, the outputting process is continued (step 35). On the other hand, if the corrective action has not been taken, the process returns to step 32 and the point of sheet jamming is indicated again.

If the stop button is pressed (step 33), the data written in the information attachment device is erased and the process is completed (step 36). In the case where the output button is pressed (step 33), only the writing of data in the information attachment device is executed, and then the process is completed (step 37).

Next, a process executed in the case where it is impossible to write the data in the information attachment device because, for example, some error occurs in the information attachment device during the above-described outputting process is described with reference to FIGS. 25–27.

Figure 25:
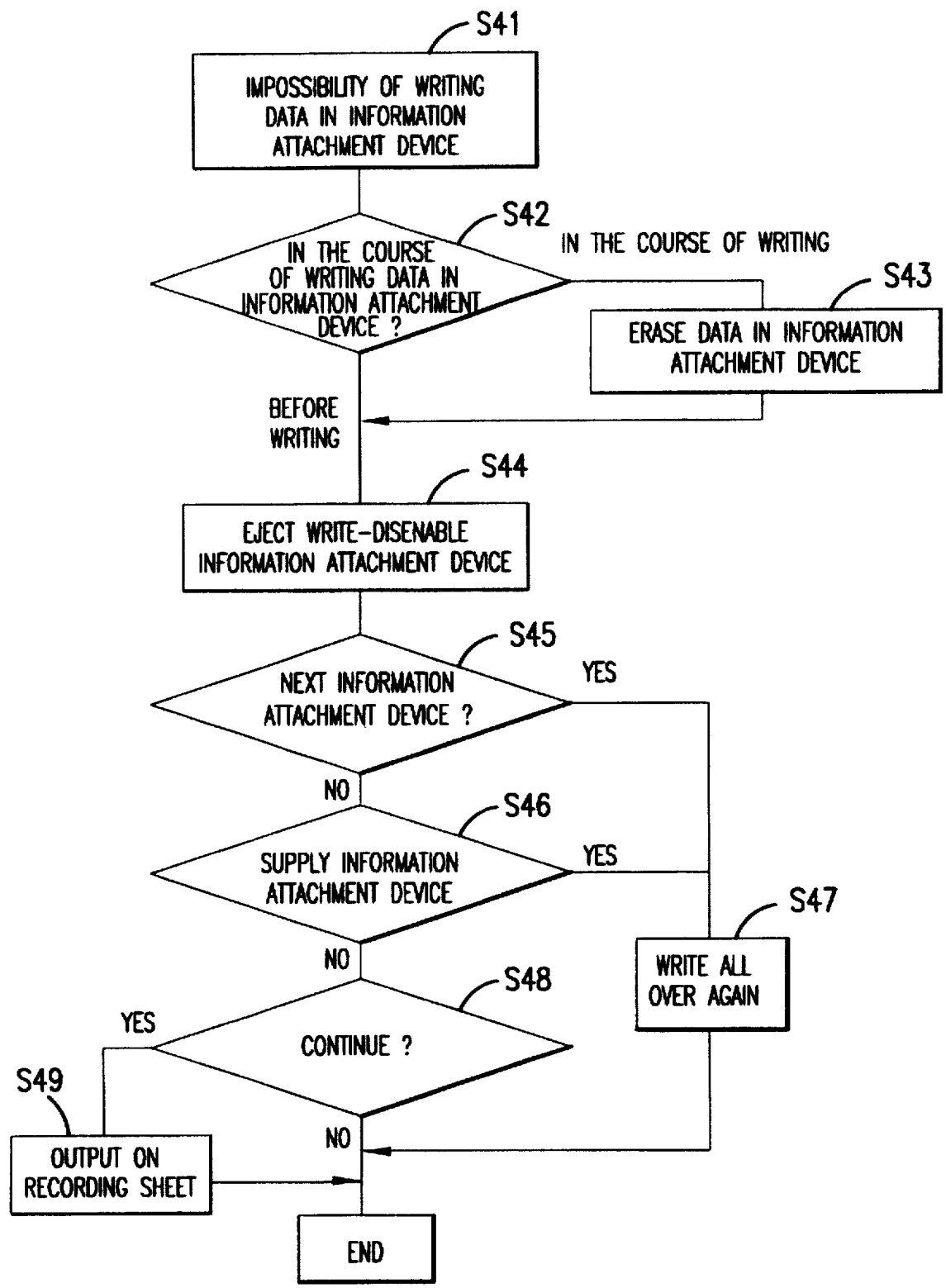
FIG. 25 is a flow chart showing procedures of a process executed when data cannot be written in an information attachment device.
Figure 26:
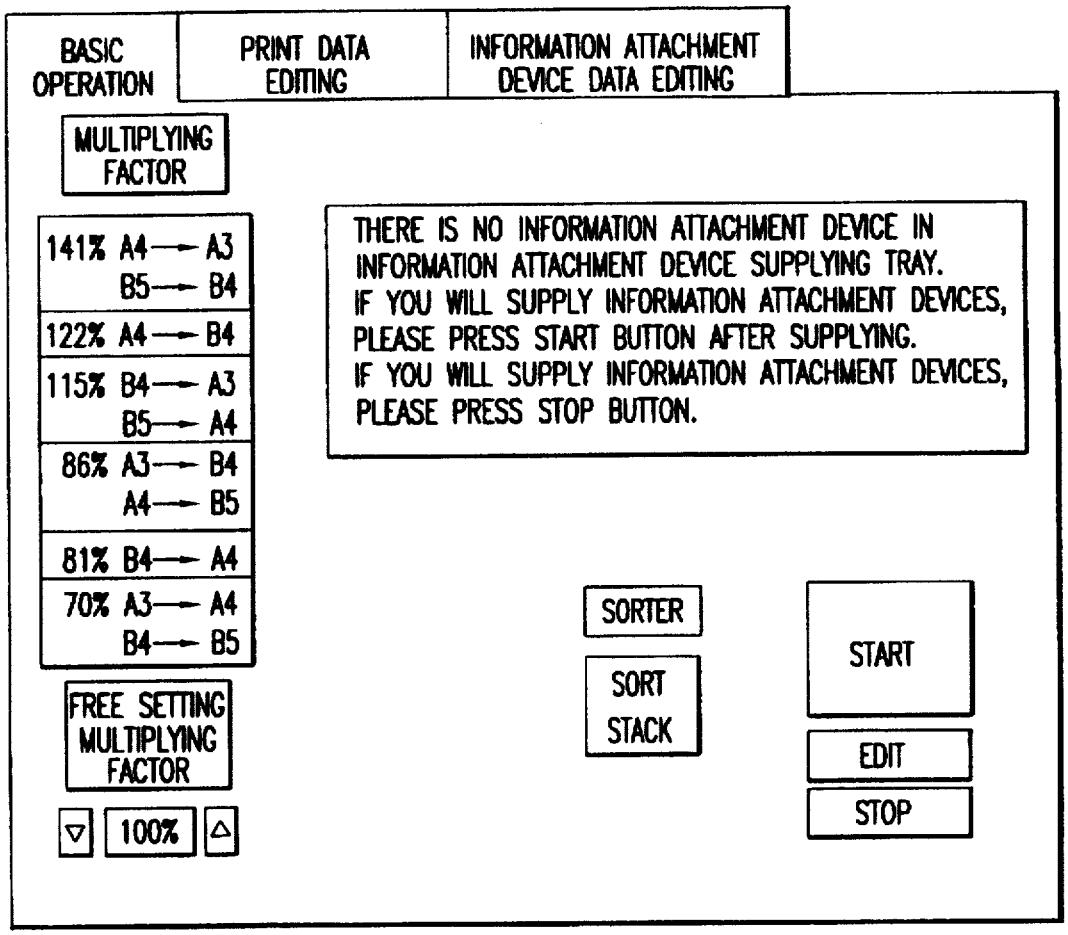
FIG. 26 shows an example of screen display in the direction in putting component when data cannot be written in the information attachment device.

FIG. 25 shows the procedures of the process. When the system controlling component 10 detects impossibility of writing data in the information attachment device (step 41), it is examined whether the process of writing data is in the course or not (step 42). If the process of writing data is in the course, the part of data which has been written in the information attachment device is erased (step 43), and then the write-disenable information attachment device is ejected to the ejection tray 37g (step 44). On the other hand, if the data is not written yet, the information attachment device is ejected to the ejection tray without writing data (step 44).

Then it is examined whether there are new information attachment devices in the information attachment device supplying stack 61 (step 45). If there is no information attachment device, the following message is displayed in the display screen of the unit 49 as shown in FIG. 26:

"There is no information attachment device in the information attachment device supplying tray. If you will supply information attachment devices, please press start button after supplying. If you will not supply information attachment devices, please press stop button." In the case where the information attachment devices are supplied to the information attachment device supply stack 61 and the start button is pressed according to the message (step 46), the data writing process is continuously executed on the new information attachment device (step 47). In the case there are new information attachment devices in the stack 61 (step 45), the data writing process is also executed continuously on the new information attachment device (step 47).

Figure 27:
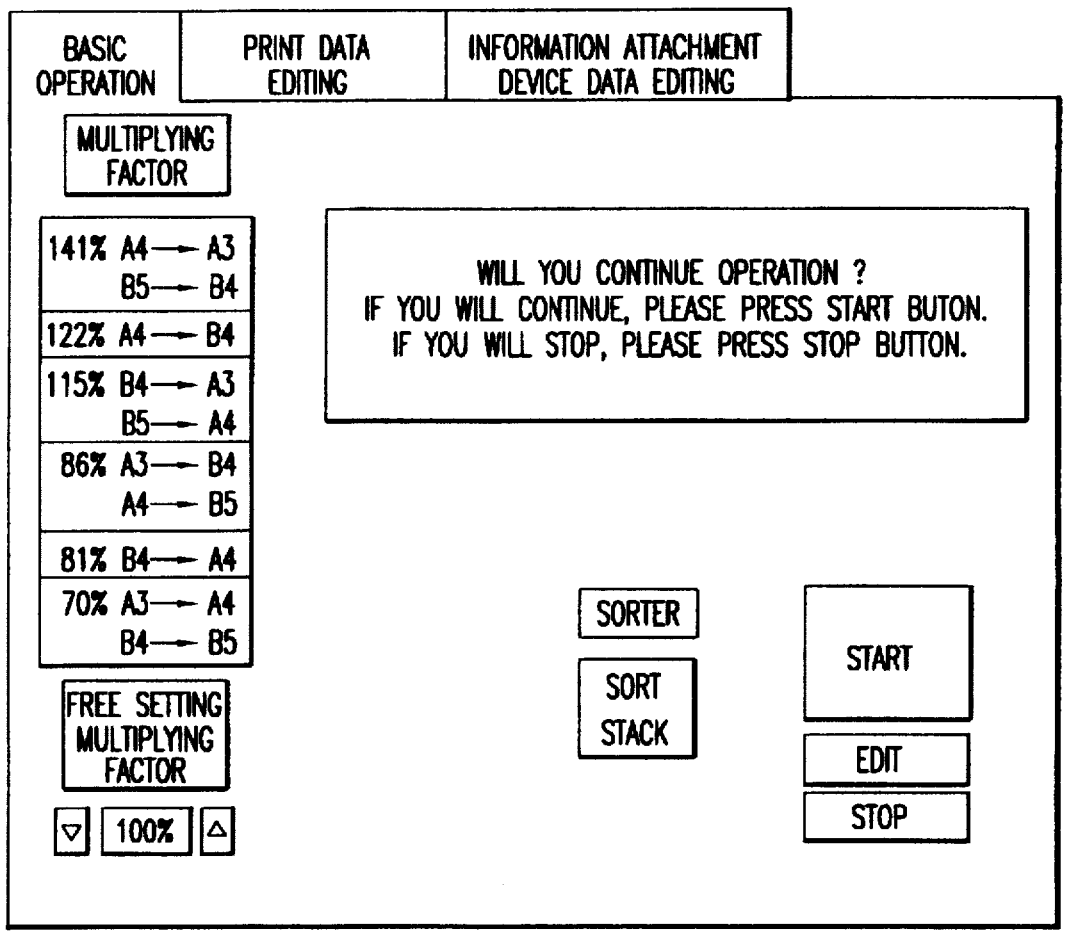
FIG. 27 shows an example of screen display in the direction inputting component in a process mode of taking corrective action against an error in outputting the recording sheet.

If no information attachment device is supplied to the supply stack 61 and the stop button is pressed (step 46) despite of the above message, the display in the display screen of the unit 49 is changed as shown in FIG. 27, where a message "Will you continue operation? If you will continue, please press start button. If you will stop, please press stop button." is displayed. If the start button is pressed according to the message (step 48), the data planned to be written in an information attachment device is printed on a recording sheet, and then the process is completed (step 49). By pressing the stop button, the process is completed.

Figure 28A:
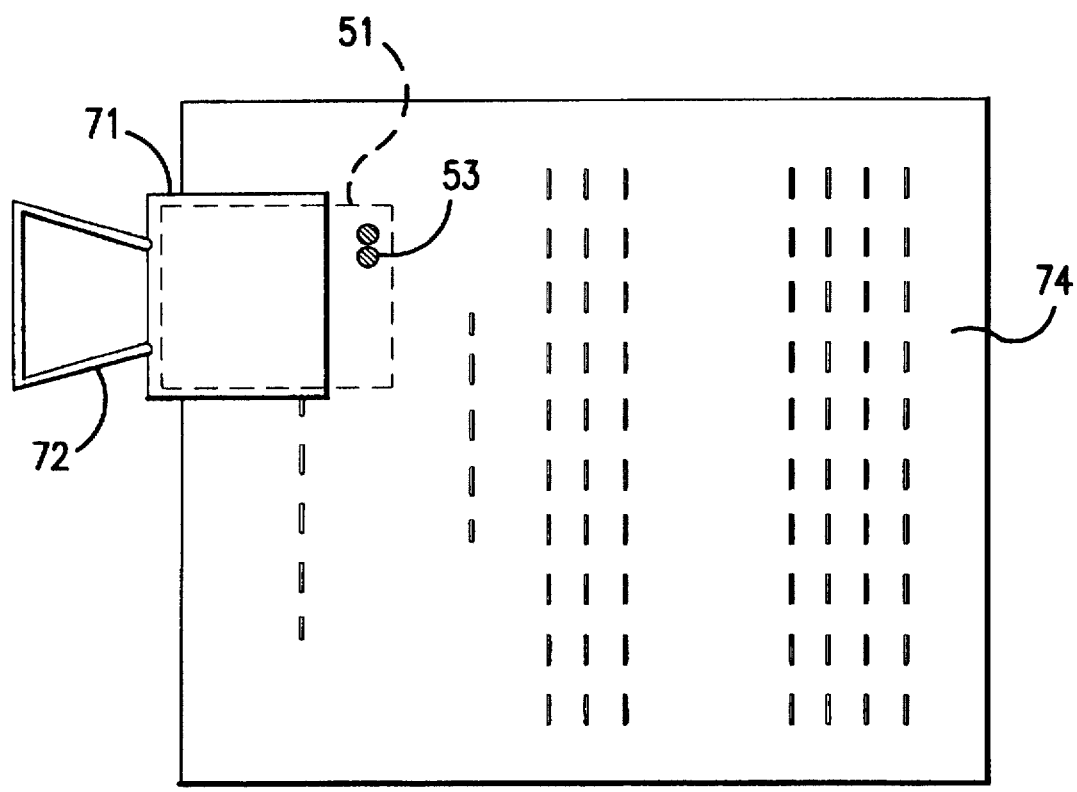
FIGS. 28(a) and 28(b) illustrate an example of a method of using the information attachment device.
Figure 28B:
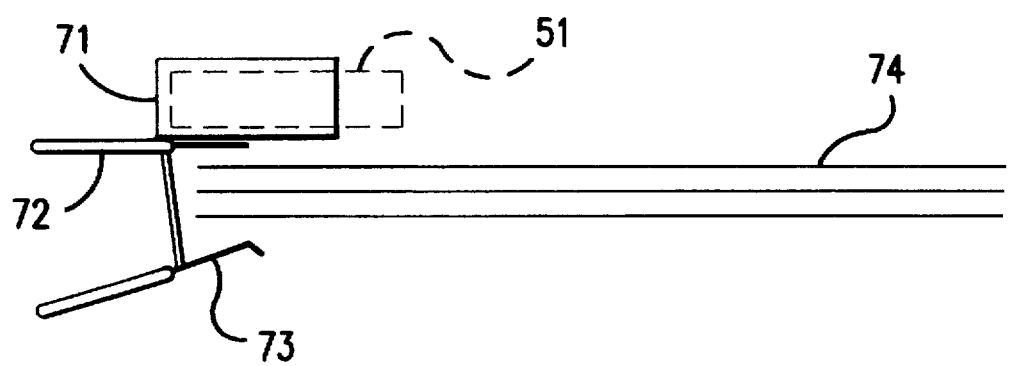

An example of the way of use of the recording sheet and the information attachment device 51 obtained as described above from the information outputting device is now explained with reference to FIGS. 28(a) and 28(b).

The information attachment device 51 and the recording sheet 74 related thereto are integrally held by inserting the information attachment device 51 in a holder 71 and holding the recording sheet 74 by a clip consisting of a plate spring 73 and tongs 72, which is integrally fitted to the holder 71. For example, it is assumed that the recording sheet 74 is a circular notice about a conference, on which the date and hour, place, subject and so forth are printed and the information attachment device 51 stores the date and hour, place and subject as data in its internal storing component 54.

The user who receives the circular notice 74 accompanied with the information attachment device 51 can directly input the date and hour, place, and subject stored in the internal storing component 54 of the information attachment device 51 to his/her information appliance having an infrared ray send/receive device through an infrared ray send/receive device 53 of the information attachment device 51. Accordingly, the user can obtain information electronically without taking time and requiring labor for reading the circular notice and inputting its contents by the keyboard, or without reading the circular notice by the image scanner and conducting an enormous amount of post-processing such as feature extraction or character recognition as before. Moreover, the information attachment device 51 is outputted simultaneously with the output of the corresponding recording sheet while related thereto, and integrated with the recording sheet 74 by the holder 71, whereby the information can be electronically obtained without looking for an external information storage medium storing the corresponding electronic data as before.

Figures 29A, 29B:
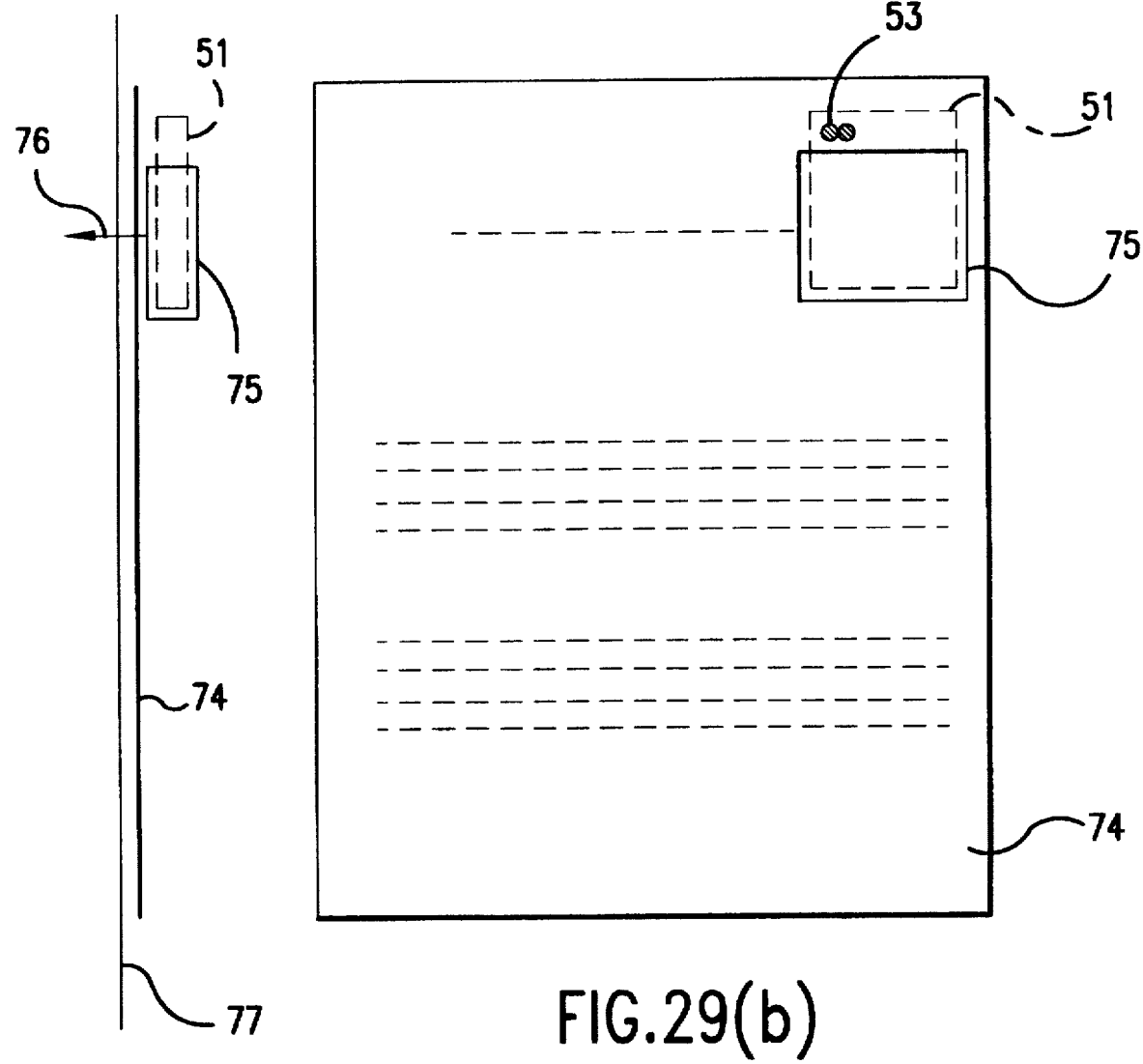
FIGS. 29(a) and 29(b) illustrate another example of the method of using the information attachment device.

Next, another example of the way of use of the recording sheet 74 and the information attachment device 51 is explained with reference to FIGS. 29(a) and 29(b).

The information attachment device 51 and the recording sheet 74 is integrated by sticking the recording sheet 74 related to the information attachment device 51 with a pin 76 provided to the holder 75 on a wall 77. For example, it is assumed that the recording sheet 74 is a posted notice showing the date and hour, place, subject and so forth of a conference, and the information attachment device 51 stores the date and hour, place and subject of the conference as the data in its internal storing component 54.

The user who looks at the posted notice 74 accompanied with the information attachment device 51 can directly input the date and hour, place, and subject stored in the internal storing component 54 of the information attachment device 51 to his/her information appliance having an infrared ray send/receive device through an infrared ray send/receive device 53 of the information attachment device 51. Accordingly, the user can obtain information electronically without taking time and requiring labor for reading the posted notice and inputting its contents by the keyboard, or without tearing off the circular notice and reading its contents by the image scanner, and conducting an enormous amount of post-processing such as feature extraction or character recognition as before. Moreover, the information attachment device 51 is outputted simultaneously with the output of the corresponding recording sheet while related thereto, and integrated with the recording sheet 74 by the holder 71, whereby the information can be electronically obtained without looking for an external information storage medium storing the corresponding electronic data as before.

Figure 30:
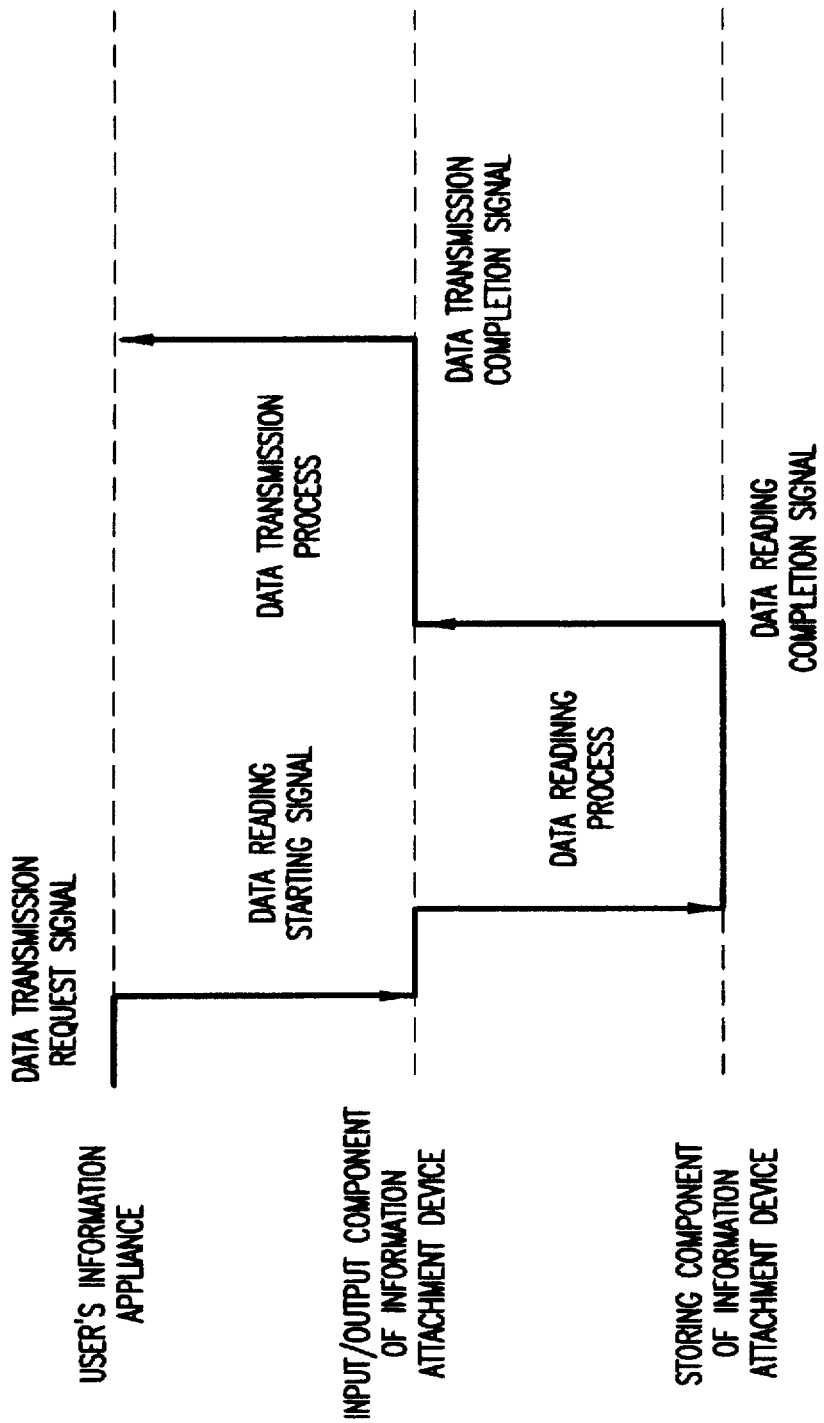
FIG. 30 is a timing chart showing an example of procedures of a data transmission process between the information attachment device and an information appliance of a user.

Here, the process of direct inputting of the data stored in the internal storing component 54 of the information attachment device 51 to the user's information appliance having the infrared ray send/receive device through the infrared ray send/receive device 53 which constitutes an input/output component 55 of the information attachment device 51 is described with reference to FIGS. 4(a), 4(b) and the timing chart shown in FIG. 30.

At first, a data transmission request signal is transmitted to the infrared ray send/receive device 53 which constitutes the input/output component 55 of the information attachment device 51 through the infrared ray send/receive device of the user's information appliance. On receiving the data transmission request signal, the input/output component 55 transmits a data reading starting signal to the storing component 54, and according thereto, the process of reading data from the storing component 54 is executed. When all data are read and the data reading process is completed, the data reading completion signal is transmitted to the input/output component 55, and subsequently the data transmission process is started. In the data transmission process, the read data are transmitted to the infrared ray send/receive device of the user's information appliance through the infrared ray send/ receive device 53 which constitutes the input/output component 55 of the information attachment device 51. After transmitting all data, the data transmission completion signal is transmitted to the infrared ray send/receive device of the user's appliance, thereby the data transmission is completed.

The foregoing description of preferred embodiment of this invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. An information outputting apparatus which stores data in an information storage medium and forms an image based on said data on a recording sheet, said information outputting apparatus comprising:

inputting means for inputting said data;

image forming means for forming an image of at least a part of said data inputted by said inputting means on said recording sheet;

storing means for storing said data inputted by said inputting means in said information storage medium;

recording sheet ejecting means for ejecting said recording sheet on which said image is formed by said image forming means to the outside of said apparatus; and information storage medium ejecting means for ejecting said information storage medium in which said data is stored by said storing means to the outside of said apparatus in synchronization with said ejecting of said recording sheet by said recording sheet ejecting means.

2. The information outputting apparatus according to claim 1, wherein said data inputted by said inputting means contains image data and additional information data, further comprising:

separating means for separating said image data and said additional information data from said data inputted by said inputting means, and wherein said image data separated by said separating means is supplied to said image forming means and said additional information data separated by said separating means is supplied to said storing means.

3. The information outputting apparatus according to claim 1, further comprising:

detecting means for detecting an error in said image forming by said image forming means; and data erasing means for erasing corresponding data written in said information storage medium by said storing means in accordance with said detecting of said error by said detecting means.

4. The information outputting apparatus according to claim 2, further comprising:

detecting means for detecting an error in said image forming by said image forming means; and data erasing means for erasing corresponding data written in said information storage medium by said storing means in accordance with said detecting of said error by said detecting means.

5. The information outputting apparatus according to claim 1, further comprising:

detecting means for detecting an error in said ejecting of said recording sheet by said recording sheet ejecting means; and data erasing means for erasing corresponding data written in said information storage medium by said storing means in accordance with said detecting of said error in said ejecting of said recording sheet by said detecting means.

6. The information outputting apparatus according to claim 2, further comprising:

detecting means for detecting an error in said ejecting of said recording sheet by said recording sheet ejecting means; and data erasing means for erasing corresponding data written in said information storage medium by said storing means in accordance with said detecting of said error in said ejecting of said recording sheet by said detecting means.

7. The information outputting apparatus according to claim 3, further comprising:

detecting means for detecting an error in said ejecting of said recording sheet by said recording sheet ejecting means; and data erasing means for erasing corresponding data written in said information storage medium by said storing means in accordance with said detecting of said error in said ejecting of said recording sheet by said detecting means.

8. The information outputting apparatus according to claim 4, further comprising:

detecting means for detecting an error in said ejecting of said recording sheet by said recording sheet ejecting means; and data erasing means for erasing corresponding data written in said information storage medium by said storing means in accordance with said detecting of said error in said ejecting of said recording sheet by said detecting means.

9. The information outputting apparatus according to claim 1, further comprising:

supplying means for holding a plurality of said information storage media;

detecting means for detecting an error in said storing of said data by said storing means; and data storing controlling means for controlling said supplying means and said storing means so that a new information storage medium is supplied by said supplying means and said storing of said data is executed by said storing means in accordance with said detecting of said error in said storing of said data by said detecting means.

10. The information outputting apparatus according to claim 2, further comprising:

supplying means for holding a plurality of said information storage media;

detecting means for detecting an error in said storing of said data by said storing means; and data storing controlling means for controlling said supplying means and said storing means so that a new information storage medium is supplied by said supplying means and said storing of said data is executed by said storing means in accordance with said detecting of said error in said storing of said data by said detecting means.

11. The information outputting apparatus according to claim 3, further comprising:

supplying means for holding a plurality of said information storage media;

detecting means for detecting an error in said storing of said data by said storing means; and data storing controlling means for controlling said supplying means and said storing means so that a new information storage medium is supplied by said supplying means and said storing of said data is executed by said storing means in accordance with said detecting of said error in said storing of said data by said detecting means.

12. The information outputting apparatus according to claim 4, further comprising:

supplying means for holding a plurality of said information storage media;

detecting means for detecting an error in said storing of said data by said storing means; and data storing controlling means for controlling said supplying means and said storing means so that a new information storage medium is supplied by said supplying means and said storing of said data is executed by said storing means in accordance with said detecting of said error in said storing of said data by said detecting means.

13. The information outputting apparatus according to claim 5, further comprising:

supplying means for holding a plurality of said information storage media;

detecting means for detecting an error in said storing of said data by said storing means; and data storing controlling means for controlling said supplying means and said storing means so that a new information storage medium is supplied by said supplying means and said storing of said data is executed by said storing means in accordance with said detecting of said error in said storing of said data by said detecting means.

14. The information outputting apparatus according to claim 6, further comprising:

supplying means for holding a plurality of said information storage media;

detecting means for detecting an error in said storing of said data by said storing means; and data storing controlling means for controlling said supplying means and said storing means so that a new information storage medium is supplied by said supplying means and said storing of said data is executed by said storing means in accordance with said detecting of said error in said storing of said data by said detecting means.

15. The information outputting apparatus according to claim 7, further comprising:

supplying means for holding a plurality of said information storage media;

detecting means for detecting an error in said storing of said data by said storing means; and data storing controlling means for controlling said supplying means and said storing means so that a new information storage medium is supplied by said supplying means and said storing of said data is executed by said storing means in accordance with said detecting of said error in said storing of said data by said detecting means.

16. The information outputting apparatus according to claim 8, further comprising:

supplying means for holding a plurality of said information storage media;

detecting means for detecting an error in said storing of said data by said storing means; and data storing controlling means for controlling said supplying means and said storing means so that a new information storage medium is supplied by said supplying means and said storing of said data is executed by said storing means in accordance with said detecting of said error in said storing of said data by said detecting means.

17. The information outputting apparatus according to claim 1, wherein said recording sheet ejecting means and said information storage medium ejecting means eject said recording sheet on which said image is formed and said information storage medium in which said data is stored, respectively, to a same tray disposed to said information outputting apparatus.

18. The information outputting apparatus according to claim 2, wherein said recording sheet ejecting means and said information storage medium ejecting means eject said recording sheet on which said image is formed and said information storage medium in which said data is stored, respectively, to a same tray disposed to said information outputting apparatus.

19. The information outputting apparatus according to claim 3, wherein said recording sheet ejecting means and said information storage medium ejecting means eject said recording sheet on which said image is formed and said information storage medium in which said data is stored, respectively, to a same tray disposed to said information outputting apparatus.

20. The information outputting apparatus according to claim 4, wherein said recording sheet ejecting means and said information storage medium ejecting means eject said recording sheet on which said image is formed and said information storage medium in which said data is stored, respectively, to a same tray disposed to said information outputting apparatus.

21. The information outputting apparatus according to claim 5, wherein said recording sheet ejecting means and said information storage medium ejecting means eject said recording sheet on which said image is formed and said information storage medium in which said data is stored, respectively, to a same tray disposed to said information outputting apparatus.

22. The information outputting apparatus according to claim 6, wherein said recording sheet ejecting means and said information storage medium ejecting means eject said recording sheet on which said image is formed and said information storage medium in which said data is stored, respectively, to a same tray disposed to said information outputting apparatus.

23. The information outputting apparatus according to claim 7, wherein said recording sheet ejecting means and said information storage medium ejecting means eject said recording sheet on which said image is formed and said information storage medium in which said data is stored, respectively, to a same tray disposed to said information outputting apparatus.

24. The information outputting apparatus according to claim 8, wherein said recording sheet ejecting means and said information storage medium ejecting means eject said recording sheet on which said image is formed and said information storage medium in which said data is stored, respectively, to a same tray disposed to said information outputting apparatus.

25. The information outputting apparatus according to claim 9, wherein said recording sheet ejecting means and said information storage medium ejecting means eject said recording sheet on which said image is formed and said information storage medium in which said data is stored, respectively, to a same tray disposed to said information outputting apparatus.

26. The information outputting apparatus according to claim 10, wherein said recording sheet ejecting means and said information storage medium ejecting means eject said recording sheet on which said image is formed and said information storage medium in which said data is stored, respectively, to a same tray disposed to said information outputting apparatus.

27. The information outputting apparatus according to claim 11, wherein said recording sheet ejecting means and said information storage medium ejecting means eject said recording sheet on which said image is formed and said information storage medium in which said data is stored, respectively, to a same tray disposed to said information outputting apparatus.

28. The information outputting apparatus according to claim 12, wherein said recording sheet ejecting means and said information storage medium ejecting means eject said recording sheet on which said image is formed and said information storage medium in which said data is stored, respectively, to a same tray disposed to said information outputting apparatus.

29. The information outputting apparatus according to claim 13, wherein said recording sheet ejecting means and said information storage medium ejecting means eject said recording sheet on which said image is formed and said information storage medium in which said data is stored, respectively, to a same tray disposed to said information outputting apparatus.

30. The information outputting apparatus according to claim 14, wherein said recording sheet ejecting means and said information storage medium ejecting means eject said recording sheet on which said image is formed and said information storage medium in which said data is stored, respectively, to a same tray disposed to said information outputting apparatus.

31. The information outputting apparatus according to claim 15, wherein said recording sheet ejecting means and said information storage medium ejecting means eject said recording sheet on which said image is formed and said information storage medium in which said data is stored, respectively, to a same tray disposed to said information outputting apparatus.

32. The information outputting apparatus according to claim 16, wherein said recording sheet ejecting means and said information storage medium ejecting means eject said recording sheet on which said image is formed and said information storage medium in which said data is stored, respectively, to a same tray disposed to said information outputting apparatus.

* * * * *